United States Patent
D'Agostino et al.

(10) Patent No.: US 9,212,907 B2
(45) Date of Patent: Dec. 15, 2015

(54) SHORT ROLLING RUNOUT COMPENSATION FOR VEHICLE WHEEL ALIGNMENT

(71) Applicant: SNAP-ON INCORPORATED, Kenosha, WI (US)

(72) Inventors: Robert J. D'Agostino, Conway, AR (US); George M. Gill, Vilonia, AR (US)

(73) Assignee: SNAP-ON INCORPORATED, Kenosha, WI (US)

( * ) Notice: Subject to any disclaimer, the term of this patent is extended or adjusted under 35 U.S.C. 154(b) by 297 days.

(21) Appl. No.: 13/872,799

(22) Filed: Apr. 29, 2013

(65) Prior Publication Data

US 2013/0307967 A1 Nov. 21, 2013

Related U.S. Application Data

(60) Provisional application No. 61/639,598, filed on Apr. 27, 2012.

(51) Int. Cl.
*G01B 11/275* (2006.01)
*G01B 21/26* (2006.01)

(52) U.S. Cl.
CPC ............ *G01B 21/26* (2013.01); *G01B 11/2755* (2013.01); *G01B 2210/16* (2013.01); *G01B 2210/28* (2013.01); *G01B 2210/30* (2013.01)

(58) Field of Classification Search
CPC ............ G01B 11/275; G01B 11/2755; G01B 2210/283; G01B 2210/306; G01B 2210/10; G01B 2210/28; G01B 2210/30
USPC ...................................................... 33/203.18
See application file for complete search history.

(56) References Cited

U.S. PATENT DOCUMENTS

| 4,349,965 | A |   | 9/1982  | Alsina |
|-----------|---|---|---------|--------|
| 4,389,793 | A | * | 6/1983  | Butler ............................. 33/336 |
| 4,457,075 | A | * | 7/1984  | Murata ....................... 33/203.15 |
| 4,953,296 | A | * | 9/1990  | Spainhour .................. 33/203.18 |
| 5,025,111 | A |   | 6/1991  | Hazel |
| 5,208,646 | A |   | 5/1993  | Rogers et al. |
| 5,535,522 | A | * | 7/1996  | Jackson ........................... 33/288 |
| 5,724,743 | A |   | 3/1998  | Jackson |
| 5,969,246 | A | * | 10/1999 | Jackson et al. .................. 73/459 |
| 6,219,134 | B1| * | 4/2001  | Voeller et al. ............. 356/139.09 |
| 6,237,234 | B1|   | 5/2001  | Jackson et al. |

(Continued)

OTHER PUBLICATIONS

Notification of Transmittal of the International Search Report and the Written Opinion of the International Searching Authority issued in International Application No. PCT/US2013/038617 mailed Aug. 22, 2013.

*Primary Examiner* — Christopher Fulton
(74) *Attorney, Agent, or Firm* — McDermott Will & Emery LLP

(57) ABSTRACT

An improved method and system are provided for performing rolling runout compensation for vehicle wheel alignment. A plurality of sets of camber and toe measurements are acquired for a pair of vehicle wheels, each at a different, relatively small rollback angle between measurements; e.g., rolling the vehicle more than 0° and less than 180° from the last wheel position. Best fit sine waves are computed for each of the camber and toe measurements using the acquired data, and the best fit parameters are applied to compute runout at the current wheel angle. The computed runouts are subtracted from the measured camber and toe values to get true camber and toe values of the pair of wheels.

20 Claims, 12 Drawing Sheets

(56) References Cited

U.S. PATENT DOCUMENTS

| | | |
|---|---|---|
| 6,532,062 B2 | 3/2003 | Jackson et al. |
| 6,661,751 B2 | 12/2003 | Asakura |
| 6,871,409 B2 | 3/2005 | Robb et al. |
| 7,313,869 B1 | 1/2008 | Rogers |
| 7,974,806 B1 | 7/2011 | Burns et al. |
| 8,418,543 B2 * | 4/2013 | Tentrup et al. ............. 73/117.02 |
| 2004/0244463 A1 | 12/2004 | Dale |
| 2005/0027473 A1 | 2/2005 | Davidson et al. |
| 2009/0271137 A1 | 10/2009 | Torri et al. |

* cited by examiner

SHORT ROLLING RUNOUT COMPENSATION FOR VEHICLE WHEEL ALIGNMENT

RELATED APPLICATION

The present invention claims priority of provisional patent application No. 61/639,598, filed Apr. 27, 2012, the contents of which are incorporated herein in their entirety.

TECHNICAL FIELD

The present subject matter relates to automotive wheel alignment systems and methods. The present subject matter has particular applicability to determining true values of wheel camber and toe angles.

BACKGROUND

To calculate true values of wheel camber and toe angles, wheel runout must be determined and subtracted from the measured camber and toe values. Conventional vehicle wheel alignment systems compensate for runout by taking camber and toe measurements with 180° rotations between the two measurement positions. By averaging these two measurements for each of camber and toe, the true camber/toe values are calculated without directly estimating runout. Disadvantageously, this technique requires a vehicle lift of considerable length, since a typical wheel will move a significant distance (e.g., about 40 inches) during the 180° roll process.

There exists a need for a technique for performing rolling runout with a small required rotation.

SUMMARY

The teachings herein improve over conventional rolling runout techniques by providing a methodology and systems for estimating runout using small rollback angles.

According to the present disclosure, the foregoing and other advantages are achieved in part by a method and system wherein a plurality of sets of camber and toe measurements are acquired for a pair of vehicle wheels, each at a different, relatively small rollback angle. For example, three sets of measurements are taken rolling the vehicle more than 0° and less than 180° from the last wheel position; e.g., about 20° to about 40° from the last wheel position, between measurements. After this data is acquired, best fit sine waves are computed for each of the camber and toe measurements, and the best fit parameters are applied to compute runout at the current wheel angle. The computed runouts are subtracted from the measured camber and toe values to get true camber and toe values of the pair of wheels.

In accord with one aspect of the disclosure, a method comprises acquiring a plurality of sets of camber and toe measurement values for a pair of vehicle wheels, each set being acquired at a different wheel angle obtained by rolling the wheels from an initial wheel angle, wherein one of the wheel angles is a current wheel angle. The method further comprises calculating best fit sine waves for camber and toe using a least squares analysis and the sets of camber and toe measurement values; computing camber runout and toe runout at the current wheel angle using the calculated sine waves; subtracting the respective computed runouts from the measured camber and toe measurement values at the current wheel angle to obtain true camber and toe values for the pair of wheels; and displaying the true camber and toe values.

In accord with another aspect of the disclosure, a wheel alignment system comprises a pair of passive heads, each comprising a target, for mounting in association with a first pair of wheels of a vehicle that is to be measured by operation of the wheel alignment system; and a pair of active sensing heads for mounting in association with a second pair of wheels of the vehicle. Each respective one of the active sensing heads comprises an image sensor for producing image data including a representation of an image of one of the targets. At least one of the active sensing heads comprises at least one tilt sensor for sensing a tilt angle of the one active sensing head when the one active sensing head is mounted on a wheel of the vehicle.

The system further comprise means for determining a spatial relationship between the active sensing heads when the active sensing heads are mounted on wheels of the vehicle; a display; and a computer. The computer is for processing image data relating to observation of the targets, the sensed tilt angle, and relationship data from the means for determining the spatial relationship, to compute a plurality of sets of camber and toe measurement values for the second pair of vehicle wheels when the active sensing heads are mounted on the second pair of vehicle wheels. Each set of measurement values are computed at a different wheel angle obtained by a user rolling the wheels from an initial wheel angle, wherein one of the wheel angles is a current wheel angle.

The computer is also for calculating best fit sine waves for camber and toe using a least squares analysis and the sets of camber and toe measurement values; computing camber runout and toe runout at the current wheel angle using the calculated sine waves; subtracting the respective computed runouts from the measured camber and toe measurement values at the current wheel angle to obtain true camber and toe values for the second pair of wheels; and causing the true camber and toe values for the second pair of wheels to be displayed on the display.

Additional advantages and novel features will be set forth in part in the description which follows and in part will become apparent to those having ordinary skill in the art upon examination of the following and the accompanying drawings or may be learned from production or operation of the examples. The advantages of the present teachings may be realized and attained by practice or use of the methodologies, instrumentalities and combinations particularly pointed out in the appended claims.

BRIEF DESCRIPTION OF THE DRAWINGS

Reference is made to the attached drawings, wherein elements having the same reference numeral designations represent like elements throughout, and wherein.

DETAILED DESCRIPTION

Wheel mounted sensors are employed in various wheel alignment systems. They enable the direct measure of wheel camber and toe angles from tilt sensors contained in the wheel mounted sensor system. However, since the wheel mounted sensor sags, toe and camber measurements from the wheel mounted sensors do not lie entirely in the wheel plane. Thus, toe and camber measurements from a wheel mounted sensor will not be true measurements of toe and camber in the wheel. Instead, measurements from a wheel mounted sensor will be equal to the true measurements shifted by a sinusoidal component. The sinusoidal variation in true toe and camber is known as runout.

Figure 1:
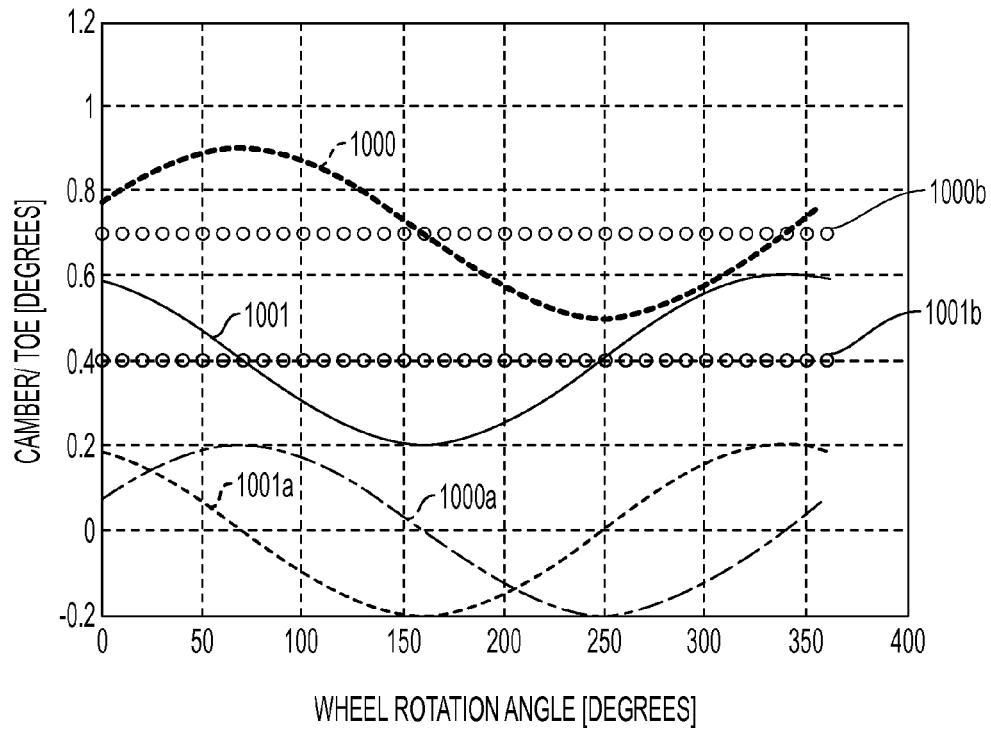
FIG. 1 depicts measurements from a typical wheel mounted sensor as it rotates through a complete 360° revolution.

FIG. 1 shows measurements from a typical wheel mounted sensor as it rotates through a complete 360° revolution. The line 1000 represents the measured cambers and the solid line 1001 represents the measured toes as the wheel rotates through 360°. This simulated wheel alignment sensor system has a runout amplitude of 0.2° and a runout phase angle of 20° when the sensor is in the vertical position. Camber runout is represented by dashed line 1000a and toe runout is represented by dashed line 1001a. The simulated wheel has a true camber of 0.7° and a true toe of 0.4°. The goal of the alignment process is to determine the true cambers 1000b and toes 1001b of the wheels (straight lines with circle markers). To get the true values, runout must be determined and subtracted from the measured cambers and toes.

A direct way to estimate the true camber and toe is to take camber and toe measurements with 180° rotations between the two measurement positions. In this procedure each camber/toe measurement will contain equal and opposite quantities of camber and toe runout. Thus, by averaging these two measurements for each of camber and toe we arrive at the true camber/toe values without ever having to directly estimate runout. The downside to this approach, however, is that a vehicle lift of considerable length is required. A typical 25" diameter wheel will move roughly 39" during the 180° roll process. This procedure will thus not be usable for many users with shorter lifts unless they perform the 180° roll with the vehicle jacked up off its wheels (a labor intensive process that users seek to avoid). For this reason it is desirable to perform rolling runout with as small a required rotation as is possible.

To meet the needs of a wider range of users it is thus desirable to estimate runout directly from camber and toe measurements; such as by finding the runout sine wave equations for camber and toe with as small a rollback angle and with as few measurements as possible. With equations for the runout sine waves for the wheels under consideration, runout compensation can be carried out. The tilt sensors in the wheel mounted sensor system provide measurements of true camber and toe superimposed with runout camber and toe (see curves 1000 and 1001 in FIG. 1).

Measured camber at a rollback angle $\theta_i$ is characterized by:

$$C_m(\theta_i) = C_t + A \sin(\theta_i + \phi) \qquad \text{[Equation 1]}$$

Measured toe at the same rollback angle $\theta_i$ is characterized by:

$$T_m(\theta_i) = T_t + A \cos(\theta_i + \phi) \qquad \text{[Equation 2]}$$

For both equations 1 and 2, $\theta_i$ is the wheel rotation angle, A is the runout amplitude (in degrees), and $\phi$ is the phase angle. $C_t$ is the true camber of the wheel and $T_t$ is the true toe. Measured camber/toe is clearly a function of angle, and by measuring camber/toe at sufficiently many rotation angles it is possible to compute any of the unknown quantities in equations 1 or 2.

As shown in the prior art, one can directly compute camber and toe runout from several measurements (see, e.g., U.S. Pat. No. 5,025,111 and U.S. Pat. No. 7,974,806). However, this solution is not ideal for small numbers of measurements collected across small wheel rotation angles. The presence of measurement noise and inaccuracy coupled with the limited resolution of measurement changes across small rotation angles makes runout estimation from a small number of measurements unreliable.

The disclosed short rolling runout technique differs from the prior art in that runout parameters are not computed analytically. Instead, least squares best fit estimates are computed for the unknown parameters in the camber and toe equations. Least squares estimates have the advantage of utilizing data redundancy in the form of an overdetermined system of equations to improve the estimation of unknown parameters. Data redundancy is crucial for accurately determining runout over small rollback angles with small numbers of measurements.

The disclosed short rolling runout procedure is simple to use. From the perspective of the end user, all that must be done is to acquire at least two measurements sets, where each measurement set consists of a camber, a toe, and a distinct wheel rotation angle measurement. The more measurements sets acquired, the more overdetermined the system of equations, and the better the estimates of the unknown runout parameters.

True camber and toe can be estimated concurrently with camber/toe runout using Equation 1 and Equation 2 above. However, this direct approach is disadvantageous, particularly for small numbers of measurement sets collected, for the following reasons. Let N be the total number of measurement sets collected during the runout estimation procedure. From Equation 1 the known measurements are the wheel angles $\theta_1$, $\theta_2$, ..., $\theta_N$ and measured cambers $C_1, C_2, \ldots, C_N$. The 3 unknown parameters are true camber $C_t$, runout amplitude A, and runout phase angle $\phi$. There is an analogous set of measurements for toe (rollback angles $\theta_1, \theta_2, \ldots, \theta_N$ and measured toes $T_1, T_2, \ldots, T_N$) and 3 unknown parameters (true camber $T_t$, runout amplitude A, and runout phase angle $\phi$).

The camber/toe unknowns could be directly estimated with at least 3 sets of measurements. For 3 measurement sets as inputs to each of Equations 1 and 2, there would be essentially no advantage with a least squares fit over direct computation methods. One could improve on the direct methods by acquiring more than 3 measurement sets, but increasing the number of measurement sets is more labor intensive than is desirable by the end user. To be practical, the number of measurement sets must be kept quite low.

An example of the disclosed short rolling runout technique, using least squares best fit estimates and a small number of measurement sets, will now be explained. Closer inspection of equations 1 and 2 reveals that the camber and toe equations share 2 of their 3 unknowns (runout amplitude A, and runout phase angle φ). It is therefore advantageous to estimate these 2 unknowns using both camber and toe measurements so that the effective number of "knowns" in the best fit estimation process is doubled. This enables performing accurate sine wave fits with very limited numbers of measurement sets.

Runout is the oscillatory component about the "true" value for each of the measured camber and toe values. For camber, runout at rollback angle $\theta_i$ is characterized by:

$$C_r(\theta_i) = A \sin(\theta_i + \phi) \quad \text{[Equation 3]}$$

And for toe, runout at the same rollback angle is characterized by:

$$T_r(\theta_i) = A \cos(\theta_i + \phi) \quad \text{[Equation 4]}$$

From equations 3 and 4, we see that estimating runout only requires estimating A and φ, and that the same parameters are used to compute toe and camber runout. By using Equations 3 and 4 as a basis, we need only 2 measurements sets to estimate camber and toe (compared to 3 measurement sets if using Equations 1 and 2). As seen from FIG. 1, toe runout 1001a is equivalent to camber runout 1000a with a 90° phase shift (as cos( ) is phase shifted +90° from sin( ). Using Equations 3 and 4, we do not directly measure runout, but we indirectly infer the unknown parameters from changes in measured camber $C_m$ and measured toe $T_m$.

By examining the change in camber and toe measurements, we get measures of the change in camber and toe runout. By examining the change in measured cambers/toes at measured rollback angles $\theta_1$ and $\theta_2$ we get measures of the change in runout. In other words, the constant components of true camber and true toe cancel out:

$$C_m(\theta_2) - C_m(\theta_1) = C_r(\theta_2) - C_r(\theta_1) = A \sin(\theta_2 + \phi) - A \sin(\theta_1 + \phi)$$

$$T_m(\theta_2) - T_m(\theta_1) = T_r(\theta_2) - T_r(\theta_1) = A \cos(\theta_2 + \phi) - A \cos(\theta_1 + \phi) \quad \text{[Equation 5]}$$

Expanding the two expressions in Equation 5 with substitution of trigonometric identities yields the following expressions for changes in camber/toe runout between 2 sets of measurements:

$$\Delta C_{1,2} = C_r(\theta_2) - C_r(\theta_1) = A \sin(\theta_2 + \phi) - A \sin(\theta_1 + \phi) = A \sin(\theta_2)\cos(\phi) + A \cos(\theta_2)\sin(\phi) - A \sin(\theta_1)\cos(\phi) - A \cos(\theta_1)\sin(\phi)$$

$$\Delta T_{1,2} = T_r(\theta_2) - T_r(\theta_1) = A \cos(\theta_2 + \phi) - A \cos(\theta_1 + \phi) = A \cos(\theta_2)\cos(\phi) - A \sin(\theta_2)\sin(\phi) - A \cos(\theta_1)\cos(\phi) + A \sin(\theta_1)\sin(\phi) \quad \text{[Equation 6]}$$

These two expressions can be rearranged to yield:

$$\Delta C_{1,2} = A \cos\phi (\sin\theta_2 - \sin\theta_1) + A \sin\phi (\cos\theta_2 - \cos\theta_1)$$

$$\Delta T_{1,2} = A \cos\phi (\cos\theta_2 - \cos\theta_1) + A \sin\phi (\sin\theta_1 - \sin\theta_2)$$

substituting variables: let $\beta_0 = A \cos\phi$ and $\beta_1 = A \sin\phi$ $$\Delta C_{1,2} = \beta_0 (\sin\theta_2 - \sin\theta_1) + \beta_1 (\cos\theta_2 - \cos\theta_1)$$

$$\Delta T_{1,2} = \beta_0 (\cos\theta_2 - \cos\theta_1) + \beta_1 (\sin\theta_1 - \sin\theta_2) \quad \text{[Equation 7]}$$

The change in cambers and toes can be recast in terms of matrix multiplication as:

$$[\Delta C_{1,2} \quad \Delta T_{1,2}] = [\beta_0 \quad \beta_1] \begin{bmatrix} \sin\theta_2 - \sin\theta_1 & \cos\theta_2 - \cos\theta_1 \\ \cos\theta_2 - \cos\theta_1 & \sin\theta_1 - \sin\theta_2 \end{bmatrix} \quad \text{[Equation 8]}$$

Equation 8 can be recast further still. Let M be the total number of measurement changes that can be computed from the measurements sets obtained (total number of camber chambers or toe changes or rollback angle changes). Δ is the 1 row×M column vector of camber and toe measurement changes, β is the 1 row×2 columns vector of unknown parameters, and Θ is the 2 rows×M columns matrix:

$$\Delta = B\Theta \quad \text{[Equation 9]}$$

What we seek to solve for is B, the vector of unknown parameters in this system of linear equations. A straightforward manipulation of Equation 9 yields:

$$B = \Delta\Theta^+ \quad \text{[Equation 10]}$$

$\Theta^+$ denotes the pseudoinverse of the matrix Θ. We compute the vector of unknown parameters, B, by multiplying the vector of changes Δ by the pseudoinverse of the matrix of wheel angle response changes Θ. This provides the least-squares estimate of the parameters in B. Note that other well-known least squares methods can be used in the disclosed short rolling runout technique instead of the matrix pseudoinverse to find the least squares estimate of the matrix B. Some of these other methods include (but are not limited to) the QR decomposition, the singular value decomposition, the LU decomposition, and the Cholesky decomposition. These alternative least squares solution methods are applied in a manner very similar to the pseudoinverse described above. Nonlinear least squares methods like the Gauss-Newton method, the Levenberg-Marquardt method, and other iterative algorithms could also be applied. By using a least squares estimation, the disclosed procedure improves over prior methods for rolling runout compensation which employ deterministic equations involving the bare minimum number of measurements, because such prior methods are less robust against measurement error.

A significant advantage of the equation rearrangement performed in Equations 6 through 10 is not readily apparent until multiple sets of measurements (greater than two) are obtained. For the case of 2 sets of measurements (as in Equation 8) there are 2 equations to solve for the 2 unknowns $\beta_0$ and $\beta_1$. For numbers of measurement sets greater than 2, however, we have an overdetermined system of equations from which we can partially reduce the effects of measurement error in camber/toe.

For 2 measurement sets there are only 2 possible measurement changes to populate the Δ matrix: $\Delta C_{1,2}$ and $\Delta T_{1,2}$. Thus we have the bare minimum number of "knowns" to compute the 2 unknown parameters in B. For 3 measurement sets there are 4 possible measurement changes to use: $\Delta C_{1,2}$, $\Delta C_{2,3}$, $\Delta T_{1,2}$, and $\Delta T_{2,3}$. The number of "knowns" (M) in this system of equations increases with the number of measurement sets collected during the rollback process (N) in the following manner:

$$M = 2(N-1) \quad \text{[Equation 11]}$$

Equations 9 and 10 are valid for any number of measurements sets N≥2. But the arrays of "knowns", Δ and Θ, must be expanded to incorporate the larger numbers of known quantities into the least squares solution for the vector B of unknowns. Generalizing the array Δ of camber and toe changes to incorporate all measurement changes (1 row×M columns):

for N=2, a 1 row×2 column vector:

$$\Delta = [\Delta C_{1,2} \Delta T_{1,2}]$$

for N=3, a 1 row×4 column vector:

$$\Delta = [\Delta C_{1,2} \Delta C_{2,3} \Delta T_{1,2} \Delta T_{2,3}]$$

...

for arbitrarily large N, a 1 row×M column vector:

$$\Delta = [\Delta C_{1,2} \Delta C_{2,3} \ldots \Delta C_{N-1,N} \Delta T_{1,2} \Delta T_{2,3} \ldots \Delta T_{N-1,N}] \quad \text{[Equation 12]}$$

Likewise, generalizing the matrix $\Theta$ of trigonometric responses to rollback angle for arbitrarily large N (to form the 2 rows×M columns matrix):

$$\Theta = \begin{bmatrix} \sin\theta_2 - \sin\theta_1 & \ldots & \sin\theta_N - \sin\theta_{N-1} & \cos\theta_2 - \cos\theta_1 & \ldots & \cos\theta_N - \cos\theta_{N-1} \\ \cos\theta_2 - \cos\theta_1 & \ldots & \cos\theta_N - \cos\theta_{N-1} & \sin\theta_1 - \sin\theta_2 & \ldots & \sin\theta_{N-1} - \sin\theta_N \end{bmatrix} \quad \text{[Equation 13]}$$

Once the arrays for $\Delta$ and $\Theta$ are populated, the next step is to compute the pseudoinverse $\Theta^+$ of matrix $\Theta$. $\Theta^+$ is computed from standard numerical linear algebra techniques. With $\Theta^+$ known, Equation 10 is applied to compute the two unknown best fit parameters from $B=(\beta_0)=(\beta_0\ \beta_1)$. Once the two unknown parameters are estimated they are used to solve for amplitude and phase angle of the runout sine wave by inverting the substitution from Equation 7:

$$\beta_0 = A\cos\phi \quad \text{[Equation 14]}$$
$$\beta_1 = A\sin\phi$$
$$A = \frac{\beta_0}{\cos\phi} = \frac{\beta_1}{\sin\phi} \rightarrow \frac{\sin\phi}{\cos\phi} = \tan\phi = \frac{\beta_1}{\beta_0} \rightarrow \phi = \tan^{-1}\left(\frac{\beta_1}{\beta_0}\right)$$

$$\text{If } \cos\phi \neq 0, A = \left|\frac{\beta_0}{\cos\phi}\right| \text{ else, } A = \left|\frac{\beta_1}{\sin\phi}\right|$$

From here, runout at the wheel angles of interest is directly computed by plugging A and φ into Equations 3 and 4. To arrive at the desired final answers, the true camber and toe, the runout camber/toe is simply subtracted from the measured camber/toe.

The disclosed short rolling runout algorithm affords multiple advantages over the prior methods for estimating runout from a limited number of measurements over a small rotation angle. The use of least squares estimation with overdetermined systems of equations provides better statistical estimates of the unknown runout parameters (amplitude and phase angle) than direct solutions with the bare minimum number of measurements. All else being equal, runout estimates are more accurate for larger total wheel rotation angles (from start to finish), as relative measurement error is smaller for larger wheel rotations. However, least squares estimation allows compensation for larger relative measurement errors associated with smaller total rotation angles by obtaining more measurements at smaller wheel angle changes between individual measurement sets.

Additionally, least squares estimates allow one to get a metric for the quality of the fit estimation. If the best fit error residuals are too large (or the conditioning of the pseudoinverse matrix is too poor), the user can be warned in real-time to perform a more labor intensive runout compensation (i.e. a 180° wheel rotation angle or a jacked runout measurement). With conventional direct runout solution methods there is no such warning, as the bare minimum number of measurements are used to compute runout.

Exemplary alignment systems embodying the disclosed short rolling runout methodology will now be described with reference to FIGS. 2-10. These so-called "hybrid" alignment systems are also described in U.S. Pat. No. 7,313,869 to Rogers, the disclosure of which is hereby incorporated by reference in its entirety. It should be understood that the hybrid alignment systems of FIGS. 2-10 are not the only system environments in which the disclosed short rolling runout techniques can be embodied. The disclosed techniques could also be embodied in a conventional machine vision aligner, such as disclosed in U.S. Pat. No. 5,724,743 to Jackson.

The examples shown in FIGS. 2-10 provide relatively low cost alignment systems that are "hybrid" in that they combine aspects of image processing with one or more other types of measurement technologies. Such a hybrid system uses visible targets, e.g. on passive heads, for two wheels of a vehicle under test, and the system uses a combination of optical imaging sensors (e.g. cameras) and other alignment sensors in active sensing heads that attach to two other wheels of the vehicle. The passive heads are substantially cheaper to manufacture than heads used in conventional alignment systems. The cost of the active sensing heads may be generally comparable to the cost of two heads of a conventional wheel alignment system.

Measuring the position and orientation of the front wheels of the vehicle using imaging technology offers additional advantages, including the ability to derive measurements associated with image processing based wheel alignment that are not normally available in a low cost system. These additional measurements may include scrub radius, (U.S. Pat. No. 6,532,062), roll radius (U.S. Pat. No. 6,237,234), and caster trail (U.S. Pat. No. 6,661,751).

Figure 2:
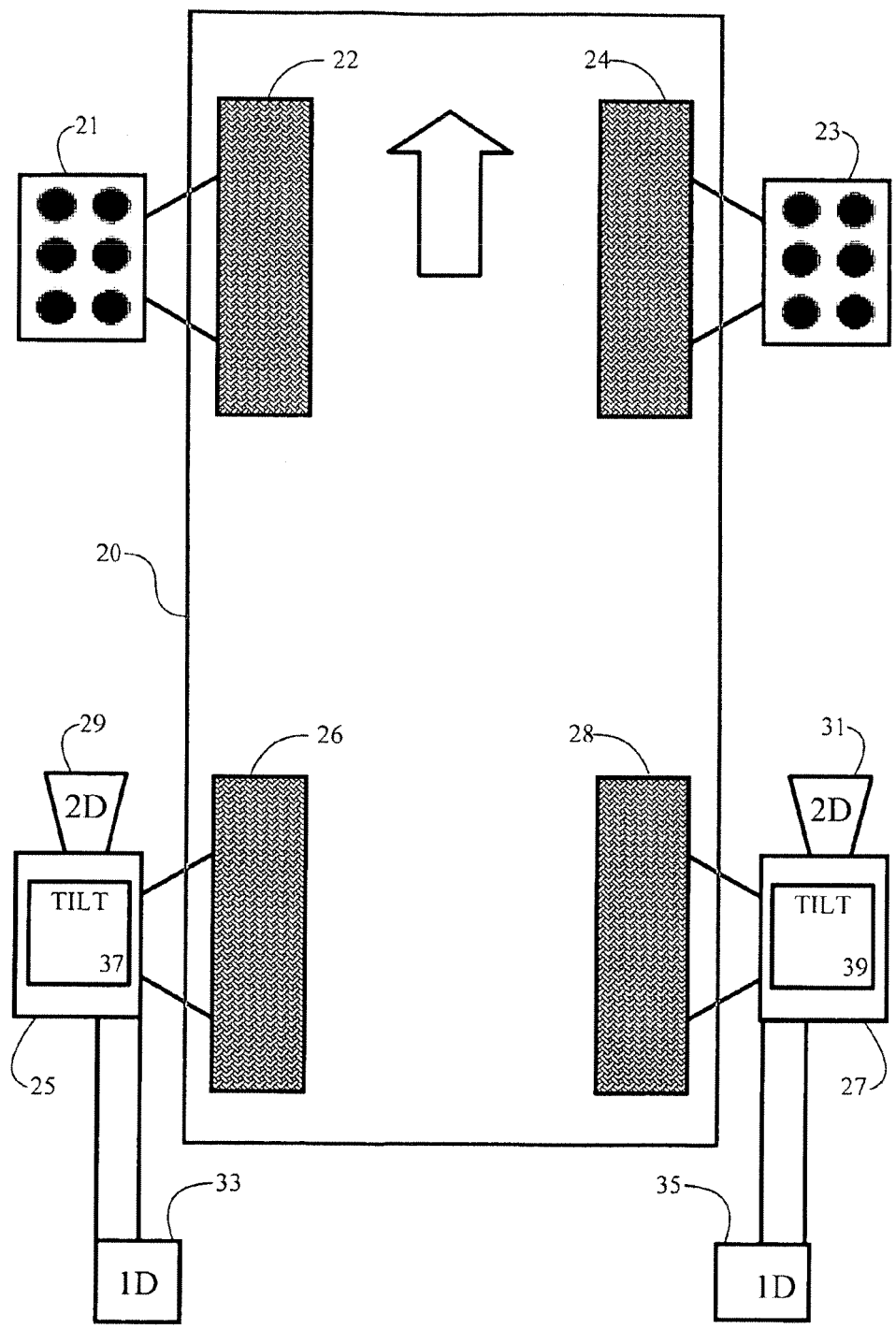
FIG. 2 diagrammatically illustrates a first arrangement of targets and active sensing heads in relation to vehicle wheels.

Reference now is made in detail to the examples illustrated in the accompanying drawings and discussed below. FIG. 2 depicts a first arrangement of targets and active sensing heads in relation to wheels of a vehicle 20 that is under test, e.g. to measure one or more wheel alignment parameters. Except for the wheels, elements of the vehicle are omitted for ease of illustration.

The wheel alignment system includes a pair of passive heads 21 and 23 mounted on respective wheels 22 and 24 of the vehicle, which are front steering wheels in this first example. The active sensing heads 25 and 27 are adapted for mounting in association with other respective wheels 26 and 28 of the vehicle, in this case the rear wheels. Each active sensing head includes an image sensor 29 or 31 for producing image data, which is expected to include an image of a passive target when the various heads are mounted to the respective wheels of the vehicle 20. In this first example, the image sensors 29 and 31 in the active sensing heads 25 and 27 are two dimensional (2D) imaging devices, e.g. cameras.

The heads 21 and 23 are passive in that they include targets but do not include any sensing elements. Each of the passive heads 21 and 23 includes a target of a type that may be observed by one of the image sensors 29 or 31 in the active heads 25 and 27. A target on a passive head 21 or 23, for image sensing by a sensor on another head, may be active or passive. An active target, such as a light emitting diode (LED), is a source driven by power to emit energy (e.g. IR or visible light)

that may be detected by a sensor. A passive target is an element that is not driven by power and does not emit energy for detection by a sensor. Assuming an image sensor in head 25 or 27, a passive target would be an object that reflects (or does not reflect) light or other energy in a manner detectable by the respective image sensor. In the example, although the targets could comprise one or more light emitting elements, the targets comprise light and dark regions that can be detected when illuminated by other sources and imaged by cameras or the like in the active sensing heads 25 and 27.

Figure 2A:
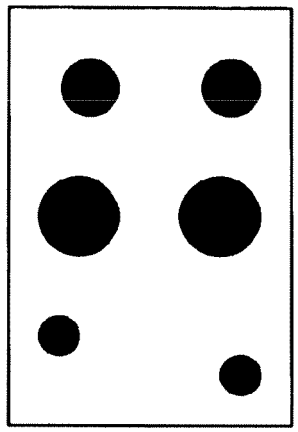
FIGS. 2A and 2B illustrate different types of targets that may be used on passive heads.
Figure 2B:
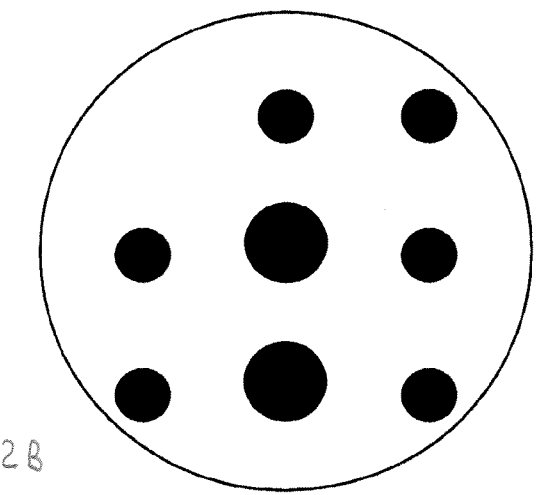

A first example of a target that can be used on either of the passive wheel heads 21 is illustrated in FIG. 2A. In this first example, the target is rectangular. A second example of a target that can be used on either of the passive wheel heads 21 is illustrated in FIG. 2B. In this second example, the target is circular. In each case, the target consists of a flat plate with a pattern of differently sized circles marked on or mounted on the surface of the plate in a pre-determined format and pattern. Although specific patterns are shown FIGS. 2A and 2B, it will be evident that a large number of different patterns can be used on each target. For example, a larger or smaller number of dots may be included and other sizes and shapes can be used for the dots. As another example, multifaceted plates or objects can also be used for the targets. Many examples utilize a number of retro-reflective elements arranged to form each target. For further information, attention is directed to U.S. Pat. No. 5,724,743 to Jackson.

The system also includes a spatial relationship sensor associated with at least one of the active sensing heads 25 or 27. The spatial relationship sensor enables measurement of the spatial relationship between the active sensing heads 25 and 27 when the active sensing heads are mounted on wheels of the vehicle. In general, spatial relationship sensors may measure relative position and/or orientation, depending on the type of sensor used. A positional measurement refers to the relative position of the measured item from the perspective or in the coordinate system of the measuring device. Measurement of position generally uses a standard coordinate system such as Cartesian coordinates or polar coordinates. Orientation may be derived from a three-dimensional position measurement, or orientation may be measured independently of position. Orientation relates to the rotational position of the measured device with respect to the measuring device expressed in a standard coordinate system. Orientation is generally expressed in rotational angles in three orthogonal reference planes.

It will be readily apparent to someone skilled in the art that the wheel alignment systems discussed herein may be implemented with various different types of spatial relationship sensors. In this first example, the system uses two conventional (1D) angle sensors 33 and 35 to measure the relative angles of the active sensing heads 25 and 27, in the toe plane.

The active heads 25 and 27 also contain gravity sensors or the like to measure tilt, typically camber and pitch, of the head. In this first example, the head 25 includes one or more tilt sensors 37; and the head 27 includes one or more tilt sensors 39.

As shown in a more detailed example later (regarding FIG. 3), the system also includes a computer. The computer processes image data relating to observation of the targets and tilt data, from the active sensing heads. The computer also processes spatial relationship data from the at least one spatial relationship sensor. The data processing enables computation of at least one measurement of the vehicle.

Measurement using image processing techniques is fundamentally different than using conventional angle measurement technology in a wheel alignment system. Although basic image processing techniques are known to those skilled in the art, a brief description is presented for clarity. The image of a body varies according to the perspective from which such body is viewed and the variation in the image is directly related to and determinable from the perspective angle of the view path along which the body is viewed. Furthermore it is known that it is possible to determine the perspective angles at which an object is viewed merely by relating the perspective image of that object with a true non-perspective image thereof. Conversely put, it is possible to determine the angles at which an object is orientated to a view path (or a plane perpendicular thereto) by comparing a perspective image of an object with a non-perspective image thereof.

In practice, a mathematical representation, or data corresponding to a true image (i.e. an image taken by viewing the target perpendicularly to its primary plane) and the dimensions of the target are preprogrammed into the memory of the computer so that, during the alignment process, the computer has a reference image to which the viewed perspective images of the targets can be compared.

The way that the computer calculates the orientation of the target is to identify certain geometric characteristics on the target, take perspective measurements of these and compare these measurements with the true image previously preprogrammed into the memory of the computer.

Furthermore, as the true dimensions of the target are preprogrammed into the memory of the computer, the method and apparatus of this invention can be used to determine the exact position of the target in three-dimensional space. This can be done by firstly determining the perspective image of certain of the elements of the pattern on the target (for example, the distances between circles) and comparing the dimensions of this image to the true dimensions of those elements. This will yield the distance that the element and, accordingly, the target is from the image sensor.

For the wheel alignment system discussed herein, the image sensor in the active head views a target attached to a wheel and produces image data which describes a perspective image of the target. The computer correlates the perspective image data for the targets with the true shape of the target. In so doing, the computer relates the dimensions of certain known geometric elements of the target with the dimensions of corresponding elements in the perspective image and by performing certain trigonometric calculations (or by any other suitable mathematical or numerical methods), calculates the alignment of the wheel of the vehicle. The computer can also calculate the three-dimensional position and orientation of the axis of rotation of the wheel (wheel axis) associated with the passive target.

For additional information regarding measurement based on processing of images of targets, attention again is directed to U.S. Pat. No. 5,724,743 to Jackson.

Figure 3:
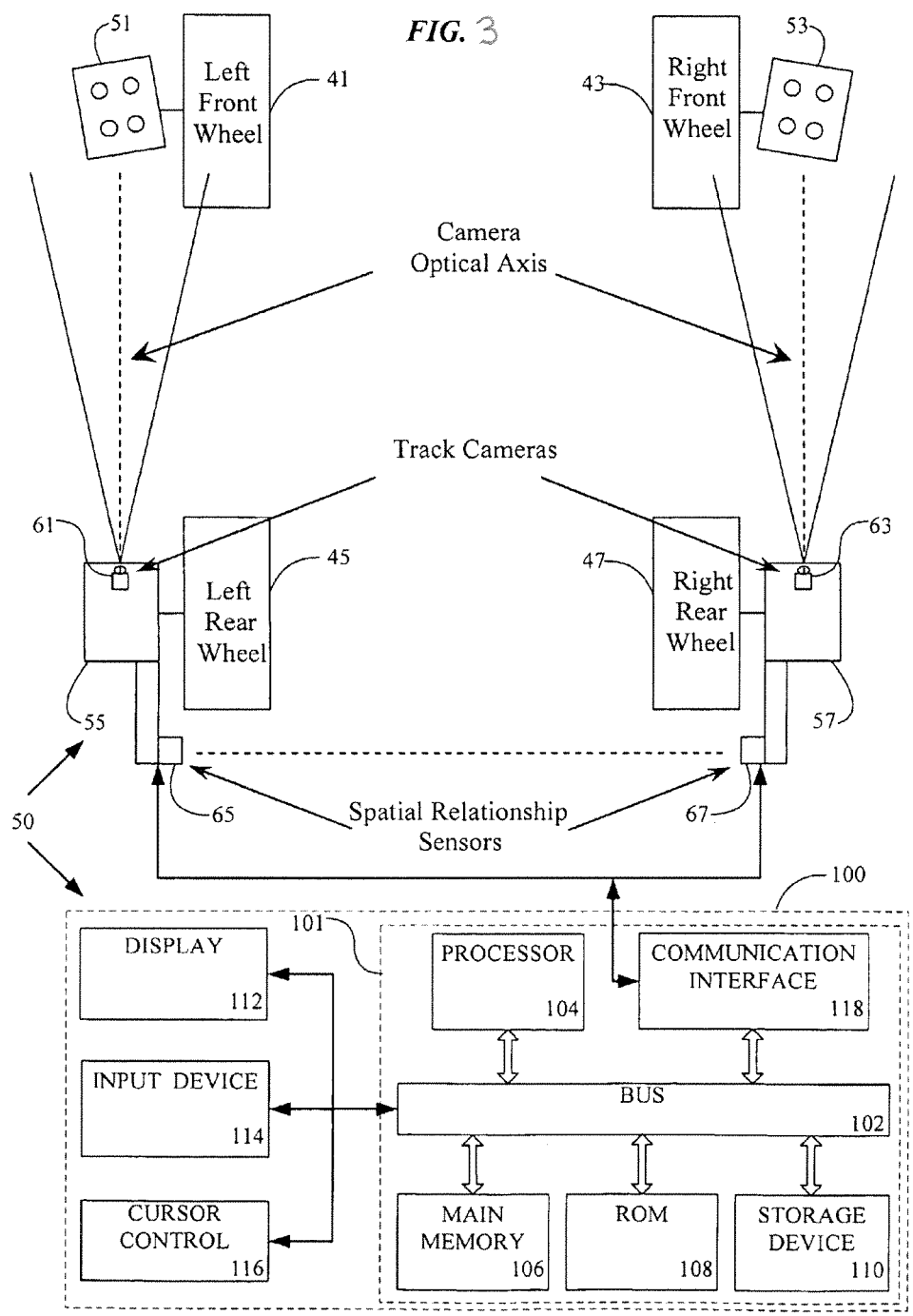
FIG. 3 is a functional block diagram of a hybrid wheel alignment system, with elements thereof mounted to wheels of a subject vehicle (although other elements of the vehicle are omitted for convenience).

FIG. 3 depicts a more comprehensive example of a low cost hybrid wheel alignment system 50 as well as four wheels 41, 43, 45 and 47 of a vehicle (otherwise not shown, for simplicity). The system 50 includes four heads 51, 53, 55 and 57 for mounting on or otherwise in association with the wheels 41, 43, 45 and 47 as shown stylistically in the drawing. A variety of different types of mounting devices may be used. In this example, the passive heads 51 and 53 are mounted on the front wheels 41 and 43, and the front heads 51 and 53 use retro-reflective targets. When mounted on the wheels as shown, the retro-reflective targets face rearward, so as to be observable by the image sensors in the respective active sensing heads. The retro-reflective targets may be similar to those used in three-dimensional (3D) machine vision alignment systems. The heads 55 and 57 mounted on the rear wheels 45 and 47 are active sensing heads, in that they include image sensing elements. In this example, the heads 55 and 57 further include tilt and spatial relationship sensing elements, as discussed below, for obtaining information for processing by a host computer system 100 of the wheel alignment system 50.

An imaging sensor, similar to the V3D camera, is positioned in each of rear heads. The optical axis of each such camera faces forward along the track of the vehicle, in order to measure the position and orientation of the targets attached to the front wheels. The cameras need not be directly on the track of the vehicle wheels, that is to say on the roll line of the wheels. The cameras need only to face alongside the wheel track sufficiently to view and capture images of the targets on the passive heads 51, 53 associated with the front wheels. In the example, the active sensing head 55 includes an image sensing module or the like containing an image sensor in the form of a camera 61 facing forward along the track of the left wheels. When so mounted, the field of view of the camera 61 includes the target portion of the passive head 51 mounted on the left front wheel 41. Similarly, the active sensing head 57 includes an image sensing module or the like containing an image sensor in the form of a camera 63 facing forward along the track of the right wheels. When so mounted, the field of view of the camera 63 includes the target portion of the passive head 53 mounted on the right front wheel 43.

One or more sensors are attached to the rear heads 55, 57 and positioned to measure a spatial relationship between the two active sensing heads. A variety of available sensing technologies may be used, and two examples are discussed, later. In the example illustrated in FIG. 2, the active sensing head 55 includes a sensor 65; and the active sensing head 57 includes a sensor 67. The sensors 65 and 67 in this application are used for sensing the relative angular relationship between the active sensing heads 55 and 57, whereas the image signals from the cameras 61 and 64 are processed to compute regular front wheel alignment parameters, such as camber and toe.

Each rear head 55 or 57 also incorporates one or more inclinometers, which are used as tilt sensors to measure the relative camber and pitch angles of each rear head to gravity. These inclinometers, for example, may comprise MEMS type devices designed to be integral to the track camera printed circuit board.

Figure 4:
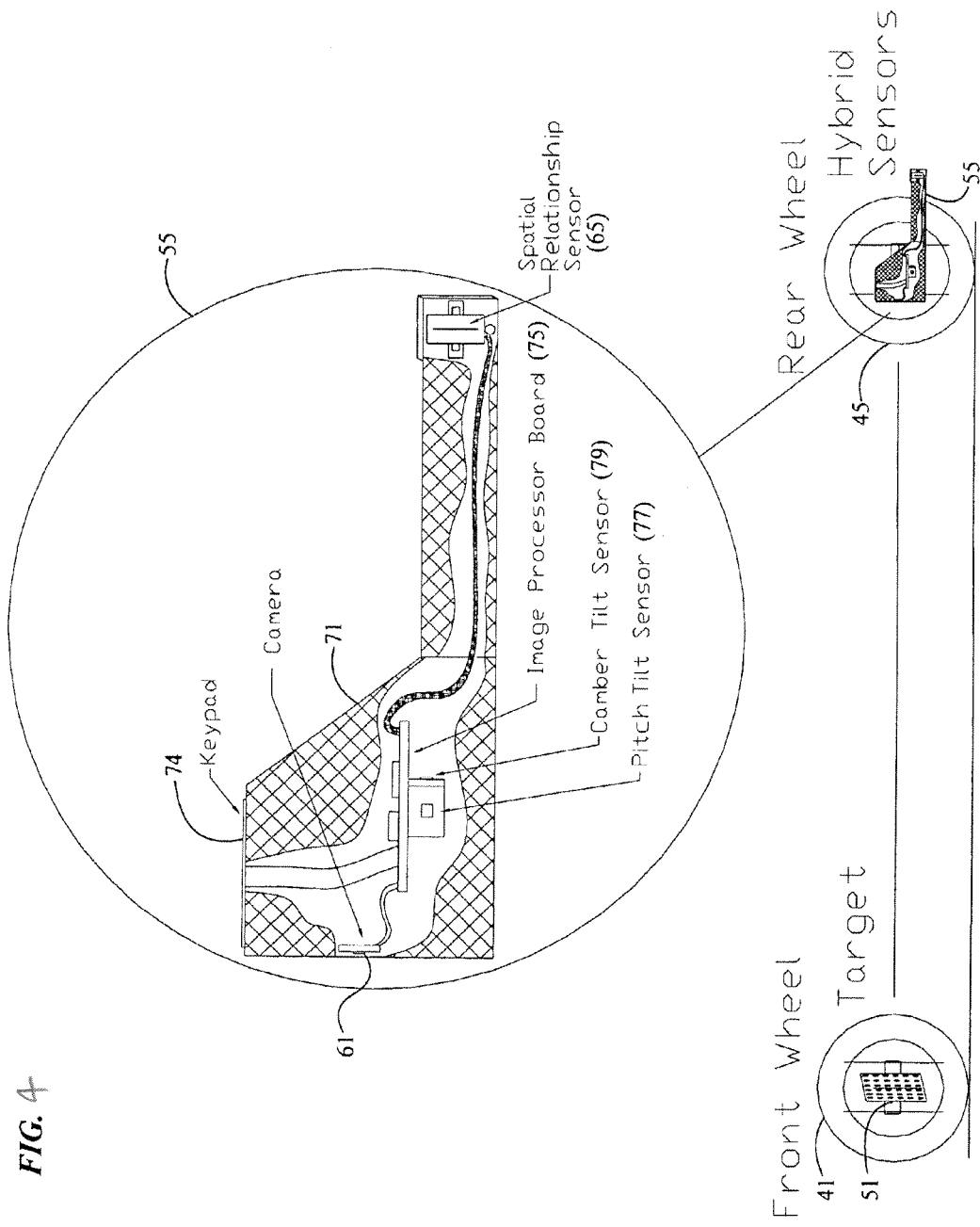
FIG. 4 is a side view of some of the wheel mounted components of the system, with one of the active sensor heads shown in a partial cross-sectional detail view.

FIG. 4 is a side view of some of the wheel mounted components of the system. This left side view shows the left front head 51, with its passive target, attached to the left front wheel 41. The side view also shows the left rear active sensing head 55, attached to the left rear wheel 45. FIG. 4 also provides an enlarged detail view, partially in cross section, of elements of the active sensing head 55.

As shown, the head 55 comprises a housing 71. Hardware for mounting the housing to the wheel is omitted for clarity. The housing 71 contains the forward facing track camera 61. In this example, the spatial relationship sensor 65 uses a beam angle detection technology, discussed later with regard to FIG. 7, although other types of sensors may be used. The housing also contains a keypad 74 for user activation of the head 55 and a printed circuit board 75 containing the data processing electronics for processing the data from the camera(s) and other sensors and communications with the host computer. For purpose of forming the sensing head of a hybrid system, the board 75 also supports a pitch tilt sensor 77 and a camber tilt sensor 79. Although shown separately, the two tilt sensors 77, 79 may be elements of a single inclinometer module. The sensors 77, 79 communicate inclination readings to a processor on the board 75, for transmission with the camera data to the host computer system 100.

Figure 5:
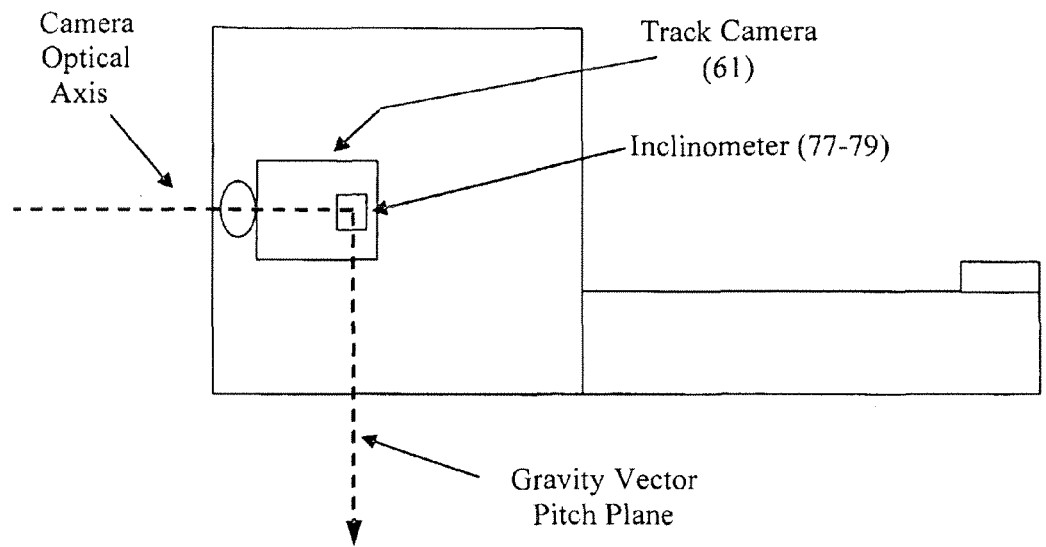
FIG. 5 is a side view of one of the active sensor heads useful in explaining the relationship of the camera axis to the pitch plane of the measured gravity vector.
Figure 6:
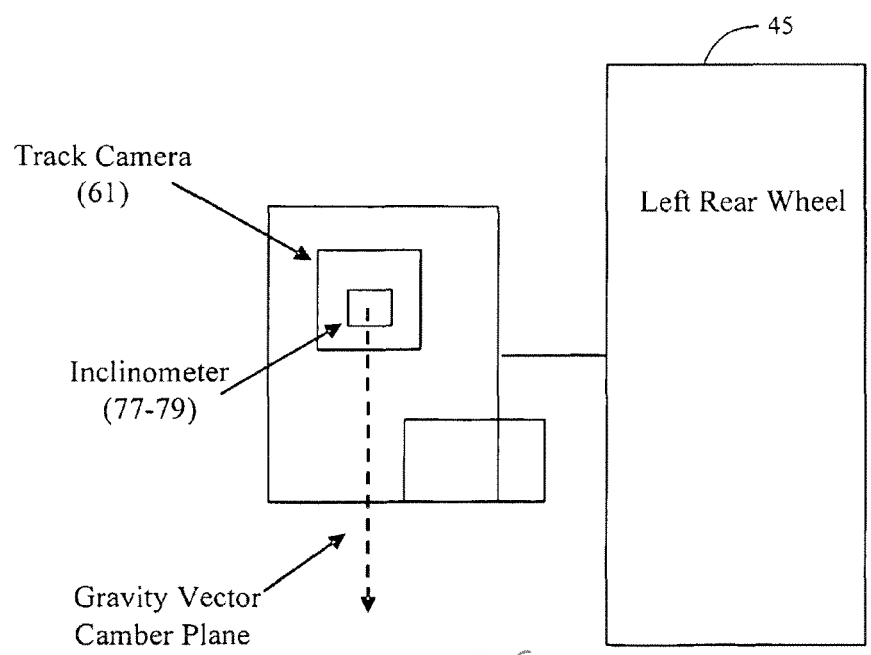
FIG. 6 is a rear view of one of the active sensor heads useful in explaining the relationship of the camera to the camber plane of the measured gravity vector.

FIGS. 5 and 6 are somewhat stylized illustrations of the active sensing head 55, in side and rear views, which illustrate the relationship of the axes measured by the tilt sensors to the other elements. It is assumed for discussion here that the tilt sensors 77-79 are elements of a single MEMS inclinometer. The inclinometer determines the gravity vector with respect to the pitch plane (FIG. 5) and the gravity vector with respect to the camber plane (FIG. 6). Similar measurements, of course, are taken for the other active sensing head 57 (FIG. 3). In this way, each head's orientation to gravity can be processed to relate each track facing camera's optical axis to gravity (FIGS. 5 and 6). In this way the relationship of each front target to gravity can also be measured by processing of the image data and the gravity vector data.

Figure 7:
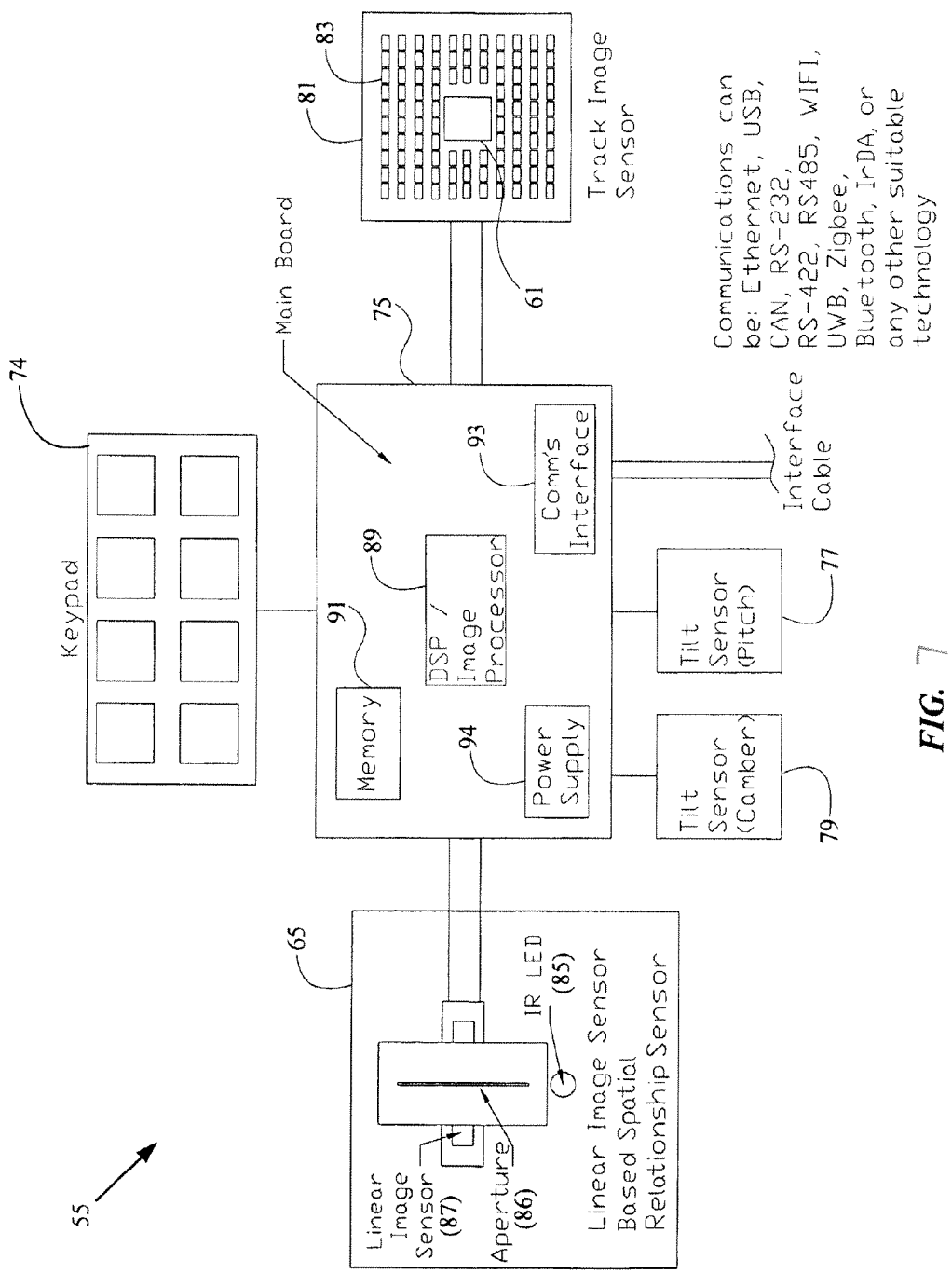
FIG. 7 is a functional block diagram of the components of one of the active sensor heads.

FIG. 7 is a functional block diagram of the elements of one of the active sensing heads, in this ease the head 55, although the elements of the head 57 will be generally similar in this first example.

As discussed above, the active sensing head 55 includes an image sensing module 81 or the like containing an image sensor in the form of the track camera 61 which in use will face forward along the track of the left wheels to allow that camera to obtain images containing the target of the passive head 51 (see also FIG. 3). The track facing image sensor module 81, illustrated in FIG. 7, includes an LED array 83, serving as an illuminator, to emit light for desired illumination of the target on the head 51 mounted to the vehicle wheel 41 on the same side of the vehicle. The camera 61 is a digital camera that senses the image for the wheel alignment application. In operation, the camera 61 generates a value of each image pixel based on analog intensity of the sensed light at the point in the image corresponding to the pixel. The value is digitized and read out to circuitry on the main printed circuit board 75. The value may be digitized either on or off of the camera sensor chip.

In this implementation, the spatial relationship sensor module 65 comprises an IR LED 85, an aperture 86 and a linear image sensor 87 such as a charge-coupled device (CCD) or CMOS unit. The IR LED 85 projects a beam of light toward a similar toe sensor module in the opposite head 57. In a similar manner, the opposite head 57 includes an IR LED that projects a beam of light toward head 55.

The IR light/radiation from the IR LED of the opposing head 57 is sensed by the linear image sensor 87, via the aperture 86. The precise point on the sensor 87 at which the IR light from the other head is detected indicates the relative angle of incidence of the light from the opposite head at the sensor 87 in the head 55. In a similar fashion, the IR light/radiation from the IR LED 85 of the head 55 is sensed by the linear image sensor, via the aperture in the opposite head 57; the precise point on the opposite linear image sensor at which the IR light from the LED 85 is detected indicates the relative angle of incidence of the light from the head 55 at the linear sensor in head 57. Processing of the angle detection data from the two linear sensors enables determination of the angular relationship between the optical camera axes of the cameras 61 and 63 in the two active sensing heads.

The circuit board 75 includes a digital signal processor (DSP) or other image processor type circuit and an associated data/program memory 91. In operation, each camera 61, 63 supplies digital image data to the image processing circuitry 89. As shown, the active sensing head 55 also includes the camber tilt sensor 79 and the pitch tilt sensor 77. These inclinometer elements supply the gravity angle measurements (see discussion of FIGS. 5 and 6) to the processor 89. The image processing circuitry 89 performs one or more operations on the data and supplies the data to a communications interface 93, for transmission to the host computer system 100.

The image processing operations of the circuit 89 may involve formatting various data for communication. Alternatively, the processor 89 may implement some degree of pre-processing before transmission to the host computer system 100. With regard to the image data, image pre-processing may include gradient computation, background subtraction and/or run-length encoding or other data compression (see e.g. U.S. Pat. No. 6,871,409 by Robb et al.). The processor 89 may also process the image data to some degree in response to the tilt data from the tilt sensors 77, 79 and/or the spatial relationship measurement data. Alternatively, the tilt and cross position data may simply be forwarded to the host computer for use in further processing of the image data.

The processor 89 in one of the active heads may be configured to receive data from the other head and perform wheel alignment parameter computations, internally, and then send only the vehicle measurement results to the host computer system 100. Moreover, processor 89 in one of the active heads may be configured to calculate all alignment values and also generate the user interface. In this case the active head may act as a web server to serve web pages that implement the user interface for the wheel alignment system, and the host computer may consist of any general purpose computer with a web browser and no wheel alignment specific software. However, to minimize cost, the major portion of the data processing may be performed at the host, in which case the processing by (and thus complexity of) the DSP/processing circuit 89 may be kept to a minimum.

The processor 89 or another controller (not separately shown) on the board 75 also provides control over operations of the active sensing head 55. For example, the control element (processor 89 or other controller) will control the timing and intensity of emissions by the LED array 83 and the IR LED 85 as well as the timing and possibly other operational parameters of the camera 81 and the linear image sensor 87. The active sensing head 55 also includes a keypad 74 for user activation of the head 55, and the processor 89 or other controller will sense and respond to inputs via the keypad 74.

The computer communication interface 93 provides two-way data communications for the components of the active sensing head 55 with the host computer 100 (FIG. 3) and in some configurations between the active heads. The communications interface 93 conforms to an appropriate data protocol standard and provides a coupling to a desired physical media, to enable data communication to and from the host computer 100 at desired speeds and in a manner desired for the particular installation. For example, the host communications interface may be a USB interface with a USB connector for cable connection to a matching interface in the host computer 100. Those skilled in the art will recognize that other data communications interfaces may be used in wheel alignment systems, such as Ethernet, RS-232, RS-422, RS-485, WIFI or wireless Ethernet, Zigbee, Bluetooth, UWB (Ultra-Wideband), IrDA, or any other suitable narrowband or broadband data communication technology.

Electronic circuits on board 75 as well as elements of image sensing module 81 and spatial relationship sensor module 85 receive power from a supply 94. Any conventional supply of an adequate level of voltage and current may be used. If system 50 uses cables, the supply may run from a conventional AC power grid or receive power over USB or Ethernet cabling. If heads 55 and 57 are wireless, the power supply may utilize battery power, either from rechargeable or disposable batteries. Alternatively, power storage media for wireless heads may consists of super-capacitors.

Returning to FIG. 3, host computer system 100 processes data from the active sensing heads 55, 57 and provides the user interface for the system 50. Host computer system 100 performs the disclosed short rolling runout calculations described herein, and displays the results (i.e., the true camber and toe) for the user. As noted above, data processing could be done in a DSP or the like in one or more of the active sensing heads 55, 57. However, to minimize the cost of the heads 55 and 57, main processing power may be provided by the host computer system 100 or similar data processing equipment. In the example, the system 100 may be implemented by a desktop type personal computer (PC) or other computer device such as a notebook computer, UMPC (ultra mobile PC), or similar device. A client server arrangement also could be used, in which case the server would perform the host processing and one of the active heads or another user device would act as a client to provide the user interface. Although those skilled in advanced wheel alignment technologies will be familiar with the components, programming and operation of various suitable computer systems, it may help to provide a brief example.

Computer system 100 includes a central processing unit (CPU) 101 and associated elements for providing a user interface. The CPU section 101 includes a bus 102 or other communication mechanism for communicating information, and a processor 104 coupled with the bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions. Although only one is shown, many computer systems include two or more storage devices 110.

The illustrated embodiment of the computer system 100 also provides a local user interface, for example, so that the system appears as a personal computer or workstation as might be used in a wheel alignment bay or an auto service shop. The computer system 100 may be coupled via bus 102 to a display 112, such as a cathode ray tube (CRT) or flat panel display, for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104, which the CPU 101 in turn uses for controlling cursor movement on display 112. The cursor input device 116 typically has two degrees of freedom in two axes, a first axis (e.g., x) and a second axis (e.g., y), that allows the device to specify positions in a plane. The couplings between the user interface elements 112-116 and the CPU 101 may be wired or may use optical or radio frequency wireless communication technologies.

The CPU 101 also includes one or more input/output interfaces for communications, shown by way of example as an interface 118 for two-way data communications with the active sensing heads 55 and 57. For purpose of the wheel alignment application, the interface 118 enables the CPU to receive image data, spatial relationship measurement data and tilt data from the active sensing heads 55 and 57. Typically the interface 118 also allows the host computer system 100 to send operational commands and possibly software downloads to the active sensing heads 55 and 57. For example, the communications interface 118 may be a USB interface with a USB connector for cable connection to matching interfaces 93 in the active sensing heads 55, 57. Those skilled in the art will recognize that other data communications interfaces may be used in wheel alignment systems such as Ethernet, RS-232, RS-422, RS-485, WIFI or wireless Ethernet, Zigbee, Bluetooth, UWB. IrDA or any other suitable narrowband or broadband data communication technology.

Although not shown another communication interface may provide communication via a network, if desired. Such an additional interface may be a modem, an Ethernet card or any other appropriate data communications device. The physical links to and from the additional communication interface(s) may be optical, wired, or wireless.

Although the computer 100 may serve other purposes in the shop, the alignment system 50 uses the computer system 100 for processing data from the heads 55, 57 to derive desired alignment measurements from the data provided by the heads, and to provide the user interface for the system 50. The computer system 100 typically runs a variety of applications programs and stores data, enabling one or more interactions via the user interface, provided through elements such as 112-116 to implement the desired processing. For wheel alignment applications, the programming will include appropriate code to process the data received from the particular implementation of the heads 55, 57, including computations to derive desired vehicle wheel alignment measurement parameters from the various data from the heads 55 and 57. The host computer 100 will typically run a general purpose operating system and an application or shell specifically adapted to perform the alignment related data processing and provide the user interface for input and output of desired information for alignment measurements and related services. Since it is a general purpose system, the system 100 may run any one or more of a wide range of other desirable application programs.

The components contained in the computer system 100 are those typically found in general purpose computer systems used as servers, workstations, personal computers, network terminals, and the like. In fact, these components are intended to represent a broad category of such computer components that are well known in the art.

At various times, the relevant programming for the wheel alignment application may reside on one or more of several different media. For example, some or all of the programming may be stored on a hard disk or other type of storage device 110 and loaded into the Main Memory 106 in the CPU 101 for execution by the processor 104. The programming also may reside on or be transported by other media for uploading into the system 100, to essentially install and/or upgrade the programming thereof. Hence, at different times all or portions of the executable code or data for any or all of the software elements may reside in physical media or be carried by electromagnetic media or be transported via a variety of different media to program the particular system and/or the electronics of the active sensing heads 55, 57. As used herein, terms such as computer or machine "readable medium" therefore refer to any medium that participates in providing instructions to a processor for execution. Such a medium may take many forms, including but not limited to, non-volatile media, volatile media, and transmission media (e.g. wires, fibers or the like) as well as signals of various types that may carry data or instructions between systems or between system components.

Runout compensation for the heads could be performed as with traditional conventional alignment heads by elevating the rear wheels and using the camber sensors to measure the runout vector then elevating the front wheels and using cameras to image the targets as they rotate about the front wheel's axis. An alternate method would be to avoid elevating the wheels by rolling the vehicle along the lift and performing the runout measurements on the heads with the inclinometers as the track cameras image the front targets as well as fixed targets on the lift, vehicle or other stationary object in order to establish the fixed coordinate system.

As noted, the rear heads 55, 57 incorporate inclinometer type tilt sensors to measure the relative camber and pitch angles of each rear head to gravity. Once runout is taken and the inclinometer angle values are measured, each head's orientation to gravity could be processed to relate each track facing camera's optical axis to gravity. Using the relationship of the track facing camera to gravity and the measured relationship of the front target to the track facing camera, the relationship of the front target to gravity can be calculated. A spatial relationship is measured by the sensors 65 and 67, to determine the spatial relationship between the track cameras 61 and 63.

Front toe, caster, and SAI would be measured using techniques similar to those embodied in an imaging aligner, such as the V3D aligner. The rear thrust angle, each rear individual toe, and the horizontal angular relationship of the track cameras to each other, would be derived from the measurements obtained by the rear spatial relationship sensors. The inclinometers would relate each track camera to each other through the common gravity vector references. With the track cameras effectively related to each other along the axis of the rear thrust line, each front target's location and orientation can be determined in a coordinate system that is directly related to the thrust angle and to gravity.

Calibration may be performed by mounting each rear head on a straight calibration bar in much the same way that the current conventional heads are calibrated. The bar is first rotated to compensate for runout. The zero offset of the rear spatial relationship sensors can then be set and by leveling the calibration bar, each camber sensor zero offset can be set. The pitch zero offset is set by leveling the head with a precision level bubble and recording the pitch inclinometer value. Enhanced camera calibration may be achieved by adding another calibration bar adapted to mount the front targets in view of the track cameras (see e.g. U.S. Patent Application Publication No. 2004/0244463 by James Dale, Jr.). After the initial calibration above is performed, the track cameras measure the orientation of the front targets as the targets and bar are rotated about the axis of the front calibration bar. The relationship of one camera to the other may be calculated and thus the relationship of each camera to the rear spatial relationship checked or calibrated. By leveling the front target calibration bar, the fixed relationship of each track camera to the local inclinometers may also be checked. This redundant check could possibly constitute an ISO check for customers that require measurement accuracy traceability.

In addition, small targets may be affixed to each front turntable allowing for an additional measurement or cross check of turn angle.

The V3D ride height pointer may also be used to measure front body points for ride height or other body index purposes.

It will be readily apparent to someone skilled in the art that the wheel alignment systems discussed herein may be implemented with various different types of spatial relationship sensors. An image sensor is one type of spatial relationship sensor. An image sensor may consist of a camera with a two dimensional array of sensing elements that produces data representative of an image expected to contain a target within the field of view of the sensor. The data from the image sensor can be processed to determine position and orientation information related to the viewed target and thus the head, wheel or other object with which the target is associated. An example of a prior art image sensor is the camera used in the Visualiner 3D commercially available from John Bean Company, Conway, Ark., a division of Snap-on Incorporated. An angle sensor is another type of applicable spatial relationship sensor. An angle sensor produces data representing the angle from the sensor relative to a point. Various types of angle sensors are generally known. One example of an angle sensor is the linear CCD sensor as used in the Visualiner available from John Bean Company.

Figure 8:
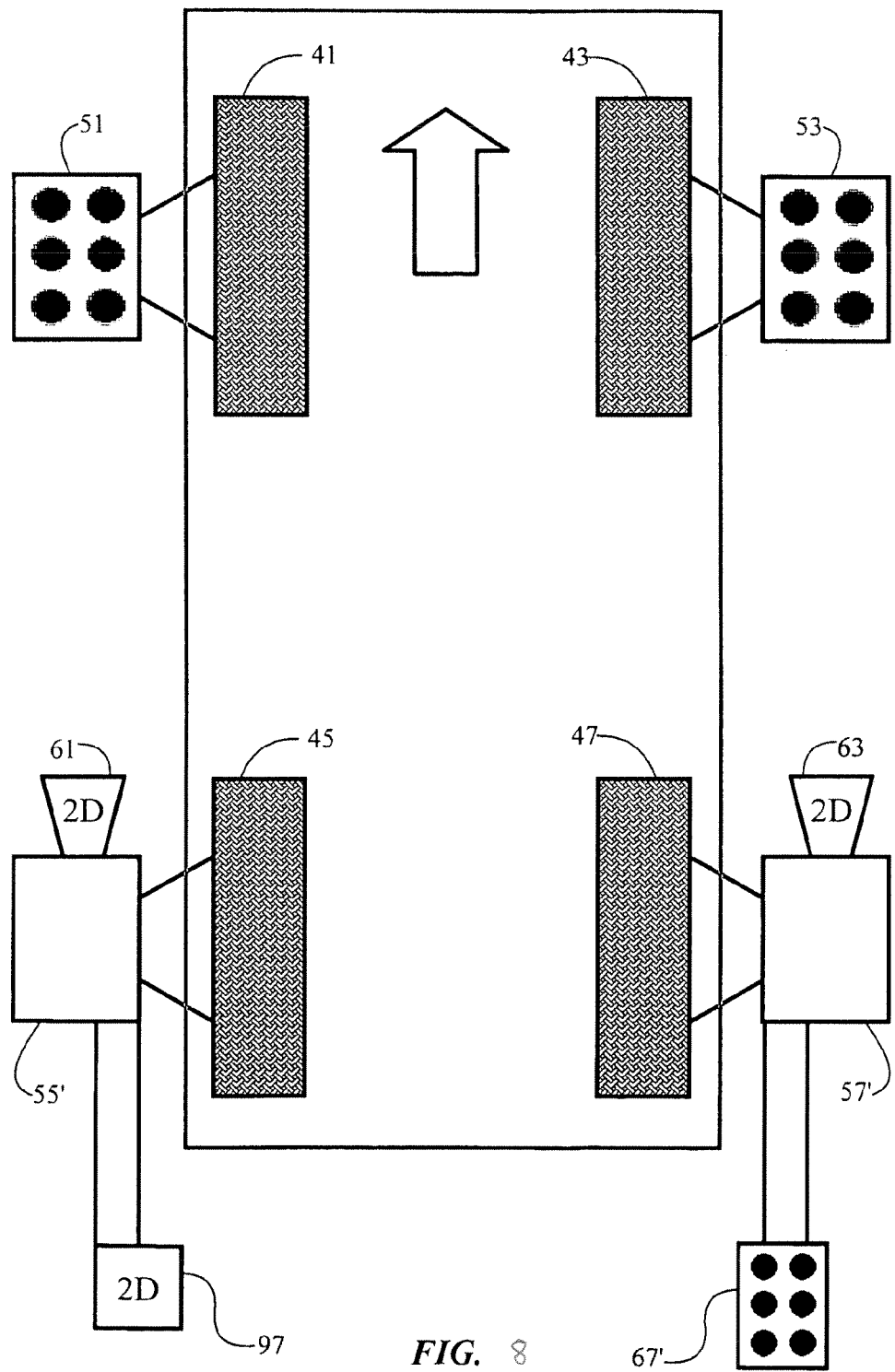
FIG. 8 diagrammatically illustrates another arrangement of targets and active sensing heads in relation to vehicle wheels, in this case using additional targets and image sensing for measurement of the spatial relationship between the active heads.
Figure 9:
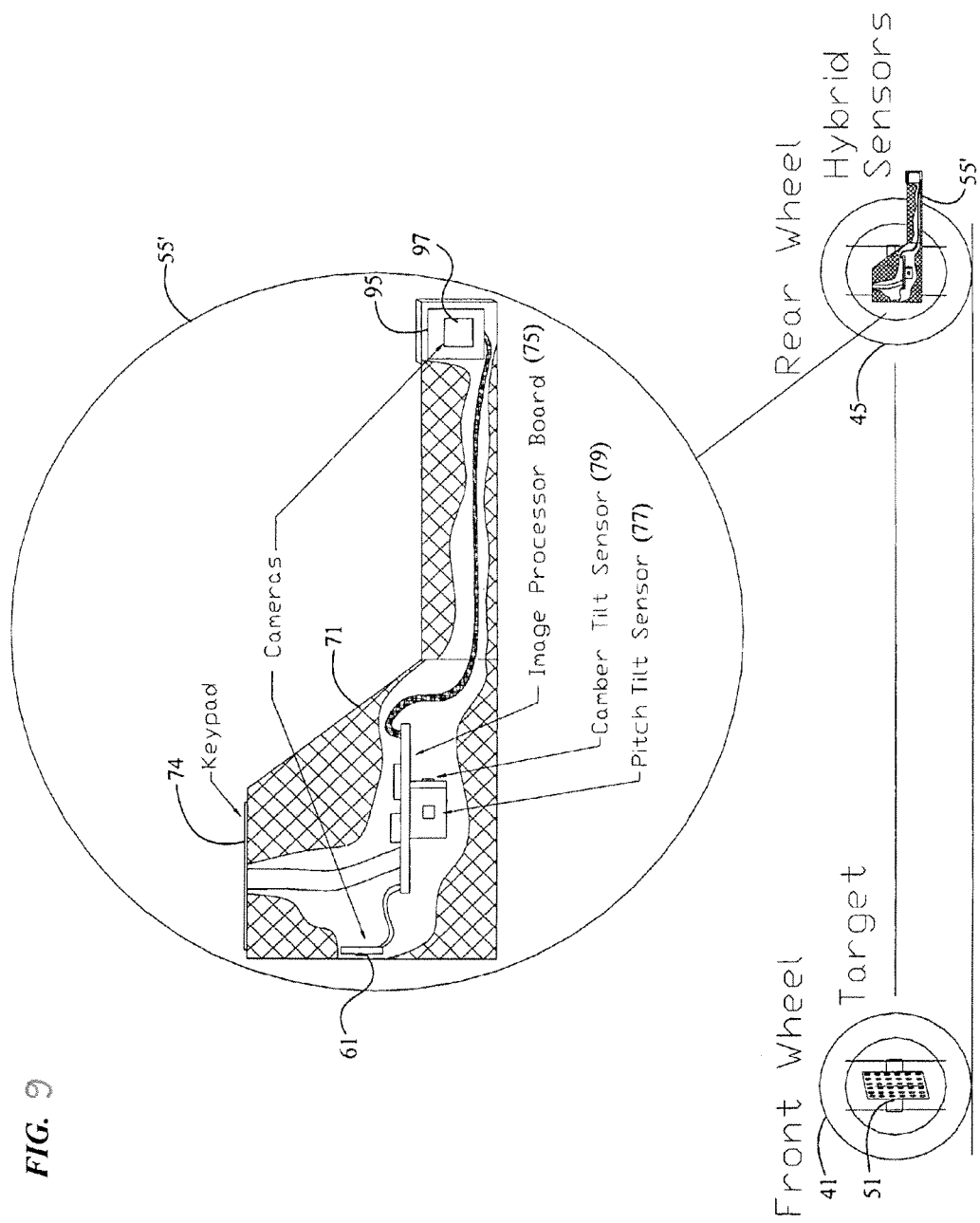
FIG. 9 is a side view of some of the wheel mounted components of the system of FIG. 8, with one of the active sensor heads shown in a partial cross-sectional detail view, generally like that of FIG. 4; but wherein the spatial relationship sensor utilizes another camera.
Figure 10:
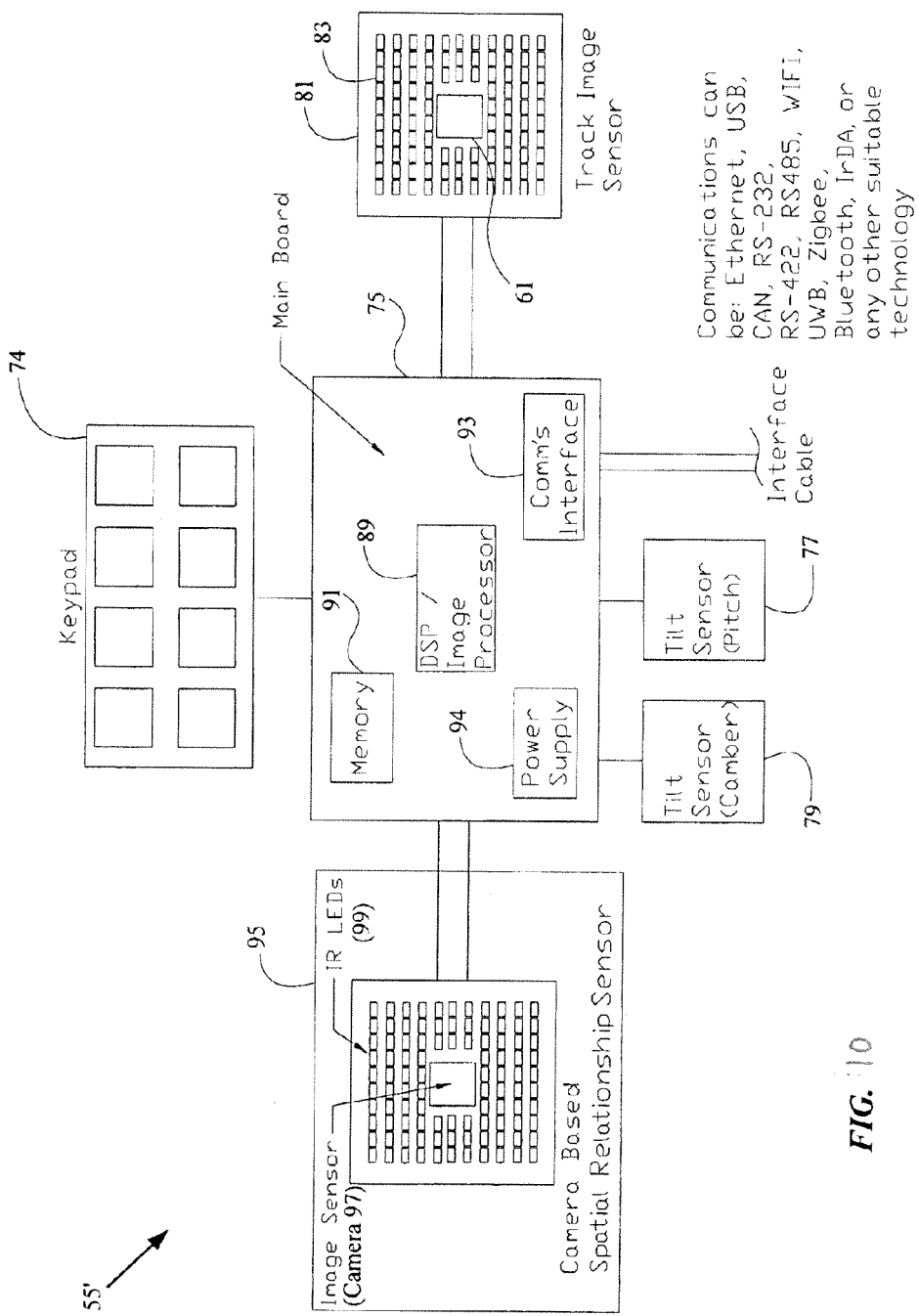
FIG. 10 is a functional block diagram of the components of the active sensor heads shown in the detail view in FIG. 8.

Hence, it may be helpful now to consider an example in which the aperture and linear image sensor style spatial relationship sensing arrangement described above relative to FIGS. 4 and 7 is replaced by an imaging type camera similar to the track camera. FIGS. 8 to 10 are views/diagrams similar to those of FIGS. 2, 4 and 7, except that the illustrations of this second implementation show such an alternate technology using an target and image sensor for the spatial relationship sensing function. Wheels and elements similar to those of the implementation of FIGS. 2, 4 and 7 are similarly numbered and are constructed and operate in essentially the same fashion as discussed above. This example uses passive two-dimensional targets 51 and 53 on the front wheels 41 and 43; and it uses active heads 55' and 57' on the rear wheels for the measurements alongside the vehicle tracks, much as in the example of FIG. 2. The rear active sensing heads use cameras 61, 63 or similar 2D image sensors to obtain images of the targets on the front heads 51, 53 and determine the relative positions and orientations of the targets with respect to the active heads, as discussed in detail above relative to FIG. 3. However, the spatial relationship of the two active heads 55', 57' is determined by at least one 2D image sensor 97, which obtains images of a 2D target 67' mounted on the opposite active head. In this example, the active head 57' has an associated target 67' similar to one of the targets on head 51 and 53, but the head 57' does not include a sensor for the spatial relationship measurement function. The active sensing head 55' uses an image processing type approach to the spatial relationship measurement across the rear of the vehicle based on imaging the target 67'. The image sensor 97 typically would be similar to the cameras or the like used as 2D image sensors in the example of FIG. 3.

As shown in more detail in FIGS. 9 and 10, the spatial relationship sensor 95 uses an image sensing module similar to the track facing image sensor module 81. The spatial relationship image sensing module 95 includes a digital camera 97 and an LED array 99. The LED array 99 serves as an illuminator. For the spatial relationship sensing application, the LED array 99 produces infrared (IR) illumination. The other rear head 57' includes an IR sensitive retro-reflective target 67' (FIG. 8) to be illuminated by the LED array 99, which in turn is sensed by the camera 97.

The spatial relationship camera 97 images the target 67' positioned on the companion head (across the rear of the vehicle) in place of the other spatial relationship sensor. Both cameras 61 and 97 could share a common processing board in the one head while the other head may simply use a single camera (for track) and a target (for cross). Processing of the target image obtained by camera 97 can compute the angular spatial relationship between the rear heads, in much the same way as the images from the active head cameras were processed to determine relative angle and/or position of the wheel mounted targets in the examples of FIGS. 2 and 3. Rather than measuring a spatial relationship angle as in the previous example, the image sensing module and associated image processing measures the 3D spatial relationship of the target on the opposite active head. For additional information regarding measurement based on processing of images of targets, attention again is directed to U.S. Pat. No. 5,724,743 to Jackson.

In the system of FIGS. 8 to 10, at least one active head contains gravity sensors to measure camber and pitch of the head. Since the imaging of the target mounted on the opposite active head allows the system to obtain a three-dimensional (3D) spatial relationship measurement between the two active heads, only one active head is required to have gravity sensors. Otherwise, the structure, operation and computations are generally similar to those of the earlier examples.

In the examples discussed above, the active heads have been associated with the rear wheels, and the targets have been associated with the front wheels of the vehicle. However, those skilled in the art will understand that there are many variations of the basic configurations discussed above. Also, there are a variety of different combinations of imaging sensors with other sensors for determining the spatial relationship that may be used. Several are described and shown in U.S. Pat. No. 7,313,869 to Rogers.

An example of the methodology of the present disclosure will now be described with reference to the flow charts of FIGS. 11A-B. The calculations described herein can be performed by a computer, such as computer 100 shown in FIG. 3. Assuming a four-wheel alignment is to be performed on a vehicle using a hybrid aligner as described herein above with reference to FIGS. 2-10, at step 1100, a set of camber and toe measurement values are acquired for the front wheels (i.e., the wheels carrying the passive targets) in a conventional manner. Then, starting at step 1105, the disclosed short rolling runout process is performed for alignment of the rear wheels of the vehicle (i.e., the wheels carrying the active heads).

A plurality of N sets of camber and toe measurement values, where N is greater or equal to 2, are acquired at several different wheel angles. At step 1105, a count index "i" is initialized to i=1. At step 1110, a set of camber and toe measurement values are acquired at an initial wheel angle where i=1, and a set of camber, toe, and wheel angle measurements are recorded at step 1115. The count index is checked at step 1120, and if i is less than N, the count index is incremented by 1 at step 1125, the wheels are rolled to a rollback position at step 1110, and steps 1115 and 1120 are repeated. The amount of rollback can be more than 0° and less than 180° from the last wheel position; e.g., about 20° to about 40° from the last wheel position.

Thus, there will be at least two set of camber and toe measurements recorded at known wheel angles. If N=3, there will be three sets of camber and toe measurements: one each at an initial wheel angle, a first rollback wheel angle, and a second rollback wheel angle.

When the count index i equals N at step 1120, best fit sine waves for camber and toe are calculated at step 1130 using the acquired sets of camber and toe measurements and a least squares analysis as described herein above. At step 1135, best fit parameters of the best fit sine waves are used to compute camber runout and toe runout at the current wheel angle. This procedure is also described herein above. Note that the current wheel angle can be the wheel angle at the rollback position when i=N, and therefore no further rolling of the wheels has taken place. Thus, if N=3, the current wheel angle will be the second rollback wheel angle.

The respective computed runouts are then subtracted from the measured camber and toe measurement values at the current wheel angle to obtain true camber and toe values for the pair of rear wheels (step 1140), and the true camber and toe values are displayed on a display (step 1145), such as display 112 shown in FIG. 3.

Figure 11A:
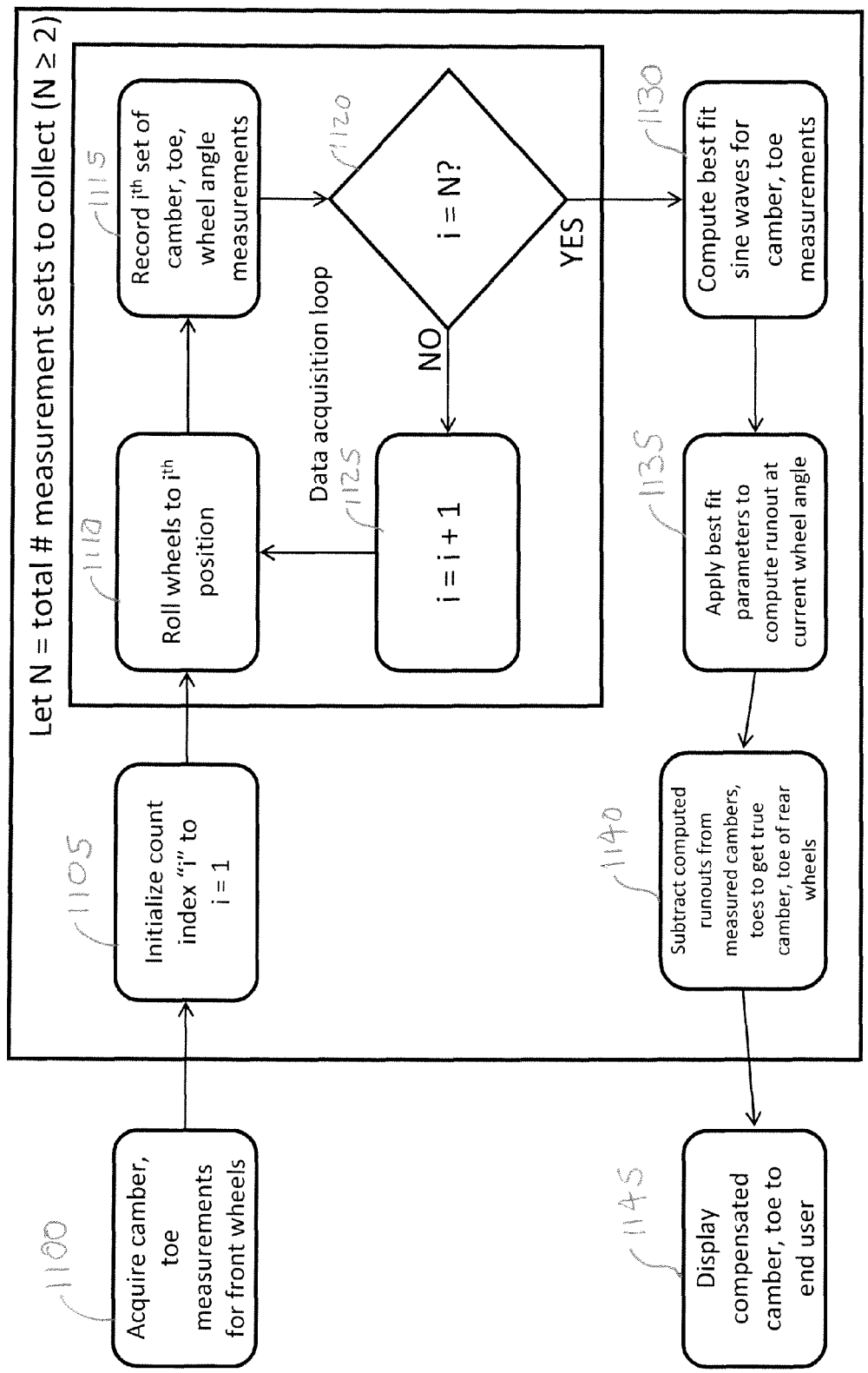
FIG. 11A is a high-level flow chart of the disclosed short rolling runout technique.
Figure 11B:
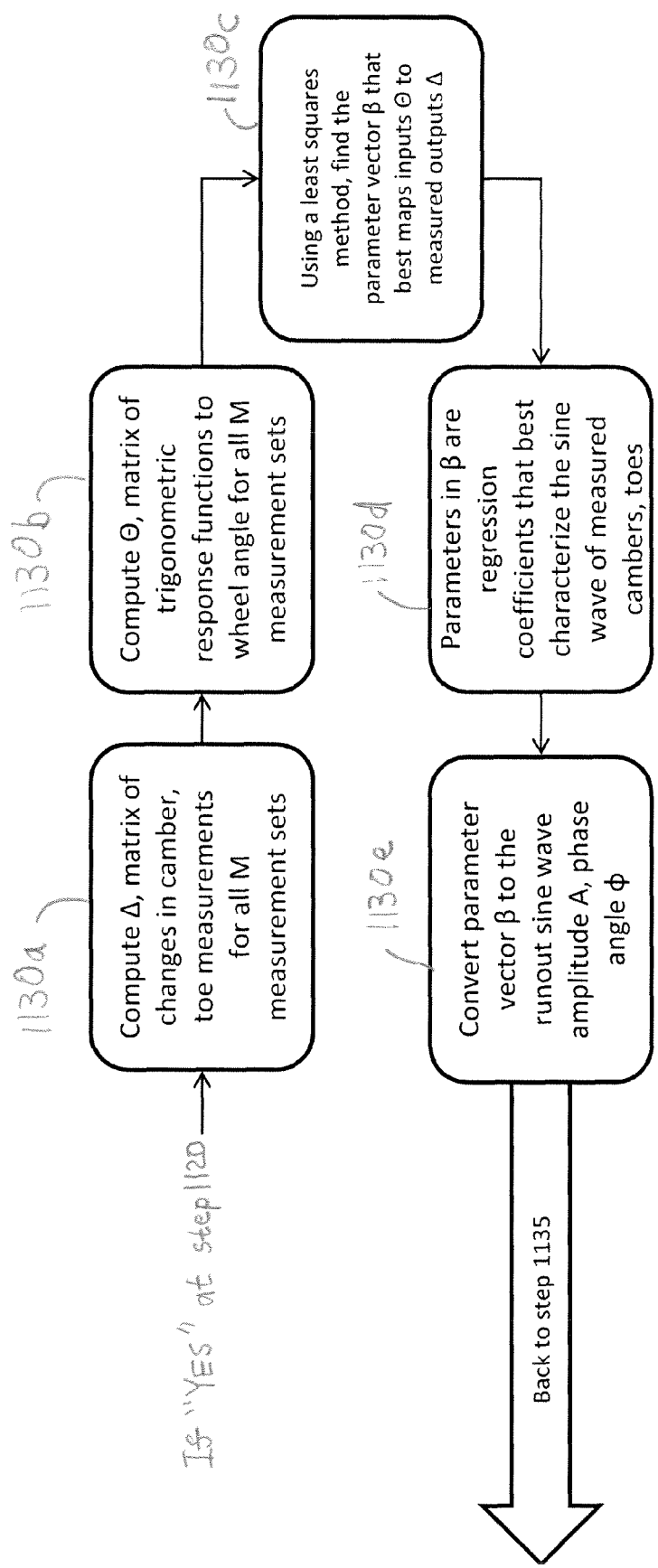
FIG. 11B is a detailed flow chart of the computation of best fit sine waves for camber and toe using a matrix least squares analysis.

The flow chart of FIG. 11B shows details of an exemplary computation of best fit sine waves for camber and toe measurements using a matrix least squares analysis, performed at step 1130 of FIG. 11A. At step 1130$a$, parameter A is computed, which is a matrix of changes in camber and toe measurements for all M measurement sets. At step 1130$b$, parameter $\Theta$, a matrix of trigonometric response functions to wheel angle for all M measurement sets, is computed. Then, using a least squares method, the parameter vector $\beta$ is found that best maps inputs $\Theta$ to measured outputs $\Delta$ (step 1130$c$). Parameters in $\beta$ are regression coefficients that best characterize the sine wave of measured cambers and toes (step 1130$d$). At step 1130$e$, parameter vector $\beta$ is converted to the runout sine wave amplitude A and phase angle $\phi$. The process of FIG. 11A then resumes at step 1135.

An example of a wheel alignment system for performing the disclosed short rolling runout procedure of FIGS. 11A-B, implemented in the apparatus shown in FIGS. 3-4, will now be described. The system comprises a pair of passive heads 51, 53, each comprising a target, for mounting in association with a first pair of wheels 41, 43 of a vehicle that is to be measured by operation of the wheel alignment system; and a pair of active sensing heads 55, 57 for mounting in association with a second pair of wheels 45, 47 of the vehicle.

Each respective one of the active sensing heads 55, 57 comprises an image sensor 61, 63 for producing image data including a representation of an image of one of the targets 51, 53, and at least one of the active sensing heads 55, 57 comprises at least one tilt sensor 77, 79 for sensing a tilt angle of the one active sensing head when the one active sensing head is mounted on a wheel of the vehicle. Active sensing heads 55, 57 further comprise means for determining a spatial relationship between the active sensing heads 55, 57 when the active sensing heads 55, 57 are mounted on wheels of the vehicle.

As described in detail herein above with reference to FIGS. 4 and 7, in certain embodiments the means for determining the spatial relationship comprises two relative angle sensing modules 65, 67, one module being associated with each of the active sensing heads 55, 57. Each of the sensing modules 65, 67 comprises an emitter for emitting a beam of light, an aperture, and an image sensor for sensing an angle of an incoming beam of light through the aperture. In other embodiments, the means for determining the spatial relationship comprises an illuminator and a camera mounted on a first one of the active sensing heads 55, 57.

The alignment system further includes a display 112 and a computer 100 for processing image data relating to observation of the targets 51, 53, the sensed tilt angle, and relationship data from the means for determining the spatial relationship 65, 67, to compute a plurality of sets of camber and toe measurement values for the second pair of vehicle wheels 45, 47 when the active sensing heads 55, 57 are mounted on the second pair of vehicle wheels 45, 47. Each set of camber and toe measurement values are computed at a different wheel angle obtained by a user rolling the wheels from an initial wheel angle. One of the wheel angles is a current wheel angle.

The computer 100 is also for calculating best fit sine waves for camber and toe using a least squares analysis and the sets of camber and toe measurement values (see FIG. 11A, step 1130); computing camber runout and toe runout at the current wheel angle using the calculated sine waves (see FIG. 11A, step 1135); subtracting the respective computed runouts from the measured camber and toe measurement values at the current wheel angle to obtain true camber and toe values for the second pair of wheels (see FIG. 11A, step 1140); and causing the true camber and toe values for the second pair of wheels to be displayed on the display 112 (see FIG. 11A, step 1145).

As also described in greater detail herein above with reference to FIG. 11A, the computer 100 is for computing the sets of camber and toe measurement values by computing a set of camber and toe measurement values at the initial wheel angle; computing a set of camber and toe measurement values at a first rollback wheel angle after the user rolls the wheels from the initial angle to the first rollback wheel angle; and computing a set of camber and toe measurement values at a second rollback wheel angle after the user rolls the wheels from the first rollback wheel angle to the second rollback wheel angle. The second rollback wheel angle is the current wheel angle.

The disclosed short rolling runout procedure performed by computer 100 advantageously enables the user to roll the wheels more than 0° and less than 180° from the initial angle to the first rollback wheel angle (e.g., about 20° to about 40°), and roll the wheels more than 0° and less than 180° from the first rollback wheel angle to the second rollback wheel angle (e.g., about 20° to about 40°). Thus, the rollback distance is shortened and does not require a long lift, and the runout of the rear wheels 45, 47 can be more easily determined.

Referring again to FIG. 3, an example will be given of how the disclosed short rolling runout procedure can be used for the front wheels 41, 43. In this example, the active sensing heads 55, 57, are not mounted on the rear wheels 45, 47. Rather, they are placed on the rack (not shown) nearby the rear wheels 45, 47, such that they are stationary relative to the vehicle, the means for determining a spatial relationship 65, 67 between the active sensing heads 55, 57 is functional, and the targets of the passive heads 51, 53 are visible to the image sensors 61, 63.

In this example, the computer 100 processes image data relating to observation of the targets 51, 53 and relationship data from the means for determining the spatial relationship 65, 67, to compute a plurality of sets of camber and toe measurement values for the front wheels 41, 43, each set being computed at a different wheel angle obtained by a user rolling the wheels from an initial wheel angle, wherein one of the wheel angles is a current wheel angle.

Computer 100 then performs the rolling runout analysis previously described with reference to FIGS. 11A-B. More particularly, computer 100 calculates best fit sine waves for camber and toe using a least squares analysis and the sets of camber and toe measurement values; computes camber runout and toe runout at the current wheel angle using the calculated sine waves; subtracts the respective computed runouts from the measured camber and toe measurement values at the current wheel angle to obtain true camber and toe values for the front wheels 41, 43; and causes the true camber and toe values for the front wheels 41, 43 to be displayed on the display 112.

The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present teachings. However, it should be recognized that the present teachings can be practiced without resorting to the details specifically set forth. In other instances, well known processing structures have not been described in detail, in order not to unnecessarily obscure aspects of the present teachings.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method comprising:
   acquiring a plurality of sets of camber and toe measurement values for a pair of vehicle wheels, each set being acquired at a different measured wheel angle obtained by rolling the wheels from an initial wheel angle, wherein one of the wheel angles is a current wheel angle;
   calculating best fit sine waves for camber and toe using a least squares analysis and the sets of camber measurement values, toe measurement values, and measured wheel angles obtained by rolling the wheels;
   computing camber runout and toe runout at the current wheel angle using the calculated sine waves;
   subtracting the respective computed runouts from the measured camber and toe measurement values at the current wheel angle to obtain true camber and toe values for the pair of wheels; and
   displaying the true camber and toe values.

2. The method of claim 1, comprising acquiring the sets of camber and toe measurement values by:
   acquiring a set of camber and toe measurement values at the initial wheel angle;
   rolling the wheels from the initial angle to a first rollback wheel angle;
   acquiring a set of camber and toe measurement values at the first rollback wheel angle;
   rolling the wheels from the first rollback wheel angle to a second rollback wheel angle; and
   acquiring a set of camber and toe measurement values at the second rollback wheel angle;
   wherein the second rollback wheel angle is the current wheel angle.

3. The method of claim 2, comprising rolling the wheels about 20° to about 40° from the initial angle to the first rollback wheel angle, and rolling the wheels about 20° to about 40° from the first rollback wheel angle to the second rollback wheel angle.

4. The method of claim 2, comprising rolling the wheels about 20° to about 40° from the initial angle to the first rollback wheel angle, and rolling the wheels more than 0° and less than 180° from the first rollback wheel angle to the second rollback wheel angle.

5. The method of claim 1, comprising acquiring one of the sets of camber and toe measurement values by rolling the wheels about 20° to about 40° from the initial wheel angle.

6. The method of claim 1, comprising calculating best fit sine waves for camber and toe using a matrix least squares analysis.

7. The method of claim 1, wherein acquiring the sets of camber and toe measurement values comprises:
   obtaining an image of a target associated with a first wheel of the vehicle, from an image sensor in a first head mounted in association with a second wheel of the vehicle to produce first image data;
   determining a tilt angle of the first head;
   obtaining an image of a target associated with a third wheel of the vehicle, from an image sensor in a second head mounted in association with a fourth wheel of the vehicle to produce second image data;
   determining a tilt angle of the second head;
   measuring a spatial relationship between the first and second heads; and
   processing the first and second image data, the tilt angles and the spatial relationship measurement, to compute the camber and toe measurement values for the second and fourth wheels of the vehicle;
   wherein the pair of vehicle wheels comprises the second and fourth wheels of the vehicle.

8. The method of claim 1, wherein acquiring the sets of camber and toe measurement values comprises:
   obtaining an image of a target associated with a first wheel of the vehicle, from an image sensor in a first head disposed stationary relative to the vehicle to produce first image data;
   obtaining an image of a target associated with a second wheel of the vehicle, from an image sensor in a second head disposed stationary relative to the vehicle to produce second image data;
   measuring a spatial relationship between the first and second heads; and
   processing the first and second image data and the spatial relationship measurement, to compute the camber and toe measurement values for the first and second wheels of the vehicle;
   wherein the pair of vehicle wheels comprises the first and second wheels of the vehicle.

9. The method of claim 1, comprising acquiring one of the sets of camber and toe measurement values by rolling the wheels more than 0° and less than 180° from the initial wheel angle.

10. A wheel alignment system, comprising:
    a pair of passive heads, each comprising a target, for mounting in association with a first pair of wheels of a vehicle that is to be measured by operation of the wheel alignment system;
    a pair of active sensing heads for mounting in association with a second pair of wheels of the vehicle, each respective one of the active sensing heads comprising an image sensor for producing image data including a representation of an image of one of the targets, at least one of the active sensing heads comprising at least one tilt sensor for sensing a tilt angle of the one active sensing head when the one active sensing head is mounted on a wheel of the vehicle;
    means for determining a spatial relationship between the active sensing heads, when the active sensing heads are mounted on wheels of the vehicle;
    a display; and
    a computer for:
       processing image data relating to observation of the targets, the sensed tilt angle, and relationship data from the means for determining the spatial relationship, to compute a plurality of sets of camber and toe measurement values for the second pair of vehicle wheels when the active sensing heads are mounted on the second pair of vehicle wheels, each set being computed at a different measured wheel angle obtained by a user rolling the wheels from an initial wheel angle, wherein one of the wheel angles is a current wheel angle;

calculating best fit sine waves for camber and toe using a least squares analysis and the sets of camber measurement values, toe measurement values, and measured wheel angles obtained by rolling the wheels;

computing camber runout and toe runout at the current wheel angle using the calculated sine waves;

subtracting the respective computed runouts from the measured camber and toe measurement values at the current wheel angle to obtain true camber and toe values for the second pair of wheels; and causing the true camber and toe values for the second pair of wheels to be displayed on the display.

11. The wheel alignment system of claim 10, wherein the means for determining the spatial relationship comprises two relative angle sensing modules, one module being associated with each of the active sensing heads.

12. The wheel alignment system of claim 11, wherein each of the sensing modules comprises: an emitter for emitting a beam of light; an aperture; and an image sensor for sensing an angle of an incoming beam of light through the aperture.

13. The wheel alignment system of claim 10, wherein the means for determining the spatial relationship comprises an illuminator and a camera mounted on a first one of the active sensing heads.

14. The wheel alignment system of claim 10, wherein the computer is for computing the sets of camber and toe measurement values by:

computing a set of camber and toe measurement values at the initial wheel angle;

computing a set of camber and toe measurement values at a first rollback wheel angle after the user rolls the wheels from the initial angle to the first rollback wheel angle; and computing a set of camber and toe measurement values at a second rollback wheel angle after the user rolls the wheels from the first rollback wheel angle to the second rollback wheel angle;

wherein the second rollback wheel angle is the current wheel angle.

15. The wheel alignment system of claim 14, wherein the user rolls the wheels about 20° to about 40° from the initial angle to the first rollback wheel angle, and rolls the wheels about 20° to about 40° from the first rollback wheel angle to the second rollback wheel angle.

16. The wheel alignment system of claim 14, wherein the user rolls the wheels more than 0° and less than 180° from the initial angle to the first rollback wheel angle, and rolls the wheels more than 0° and less than 180° from the first rollback wheel angle to the second rollback wheel angle.

17. The wheel alignment system of claim 10, comprising computing one of the sets of camber and toe measurement values after the user rolls the wheels about 20° to about 40° from the initial wheel angle.

18. The wheel alignment system of claim 10, wherein the computer is for calculating best fit sine waves for camber and toe using a matrix least squares analysis.

19. The wheel alignment system of claim 10, wherein when the pair of active sensing heads are disposed stationary relative to the vehicle such that the means for determining a spatial relationship between the active sensing heads is functional, the computer is for:

processing image data relating to observation of the targets and relationship data from the means for determining the spatial relationship, to compute a plurality of sets of camber and toe measurement values for the first pair of vehicle wheels, each set being computed at a different wheel angle obtained by a user rolling the wheels from an initial wheel angle, wherein one of the wheel angles is a current wheel angle;

calculating best fit sine waves for camber and toe using a least squares analysis and the sets of camber and toe measurement values;

computing camber runout and toe runout at the current wheel angle using the calculated sine waves;

subtracting the respective computed runouts from the measured camber and toe measurement values at the current wheel angle to obtain true camber and toe values for the first pair of wheels; and causing the true camber and toe values for the first pair of wheels to be displayed on the display.

20. The wheel alignment system of claim 10, comprising computing one of the sets of camber and toe measurement values after the user rolls the wheels more than 0° and less than 180° from the initial wheel angle.

* * * * *